United States Patent
Chen et al.

(10) Patent No.: US 12,443,601 B2
(45) Date of Patent: Oct. 14, 2025

(54) DATA COMPRESSION FOR REAL-TIME ANALYTICS

(71) Applicant: Uber Technologies, Inc., San Francisco, CA (US)

(72) Inventors: Ting Chen, San Jose, CA (US); Yupeng Fu, Palo Alto, CA (US); Maksym Ivanchenko, Menlo Park, CA (US); Yu Luo, Toronto (CA); Christopher Peck, Menlo Park, CA (US); Kirk Rodrigues, Toronto (CA); Benjamin Ross, New York, NY (US); Ujwala Prabhakar Tulshigiri, Campbell, CA (US); Kaibo Wang, Seattle, WA (US); Yun Zhang, Seattle, WA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/313,752

(22) Filed: May 8, 2023

(65) Prior Publication Data
US 2024/0378202 A1     Nov. 14, 2024

(51) Int. Cl.
*G06F 16/2453*     (2019.01)
*G06F 16/22*     (2019.01)
(Continued)

(52) U.S. Cl.
CPC ...... *G06F 16/24547* (2019.01); *G06F 16/221* (2019.01); *G06F 16/2448* (2019.01);
(Continued)

(58) Field of Classification Search
CPC .......... G06F 16/24547; G06F 16/2448; G06F 16/221; G06F 16/24542; G06F 16/2455; G06F 16/248
(Continued)

(56) References Cited

U.S. PATENT DOCUMENTS 9,619,478 B1    4/2017   Singh et al.
10,469,101 B2   11/2019   Ozaki
(Continued)

OTHER PUBLICATIONS

Apache Pinot. "Indexing." https://docs.pinot.apache.org/basics/indexing. Retrieved on May 22, 2023. 3 pages.
(Continued)

*Primary Examiner* — Joshua Bullock
(74) *Attorney, Agent, or Firm* — Dority & Manning, P.A.

(57) ABSTRACT

Systems and methods for compressing and querying data for real-time analytics. The system can receive log data and generate an intermediate representation by parsing a log template and variables from the log data into a columnar format. The method includes generating a compressed intermediate representation associated with an index type and storing the compressed intermediate representation in the columnar format based on the index type. The method includes receiving a search query and analyzing the search query to identify a user defined function. The method includes parsing the search query to convert the search query into one or more predicates that satisfy the search query. The method includes filtering the compressed log data based on the one or more predicates and providing a query result.

18 Claims, 9 Drawing Sheets

(51) Int. Cl.
  *G06F 16/242* (2019.01)
  *G06F 16/2455* (2019.01)
  *G06F 16/248* (2019.01)

(52) U.S. Cl.
  CPC .... *G06F 16/24542* (2019.01); *G06F 16/2455* (2019.01); *G06F 16/248* (2019.01)

(58) Field of Classification Search
  USPC ........................................................ 707/693
  See application file for complete search history.

(56) References Cited

U.S. PATENT DOCUMENTS

| | | | |
|---|---|---|---|
| 11,144,580 B1 | 10/2021 | Ben-Natan et al. | |
| 11,243,967 B2* | 2/2022 | Fuerst | G06F 16/288 |
| 11,500,839 B1 | 11/2022 | Pedapati et al. | |
| 12,079,587 B1* | 9/2024 | Radford | G06F 40/58 |
| 2011/0066590 A1* | 3/2011 | Chang | G06F 16/00 707/602 |
| 2022/0116291 A1* | 4/2022 | Hines | H04L 41/069 |
| 2023/0017165 A1 | 1/2023 | Walters et al. | |
| 2023/0195694 A1* | 6/2023 | Lion | G06F 16/148 707/687 |
| 2023/0377692 A1* | 11/2023 | Cheung | G16B 50/40 |

OTHER PUBLICATIONS

Apache Pinot. "Inverted Index." https://docs.pinot.apache.org/basics/indexing/inverted-index Retrieved on May 22, 2023. 2 pages.
Apache Pinot. "JSON Index." https://docs.pinot.apache.org/basics/indexing/json-index Retrieved on May 22, 2023. 13 pages.
Apache Pinot. "Geospatial." https://docs.pinot.apache.org/basics/indexing/geospatial-support. Retrieved on May 22, 2023. 7 pages.
Apache Pinot. "Range Index." https://docs.pinot.apache.org/basics/indexing/range-index Retrieved on May 22, 2023. 2 pages.
Apache Pinot. "Realtime Distributed OLAP datastore, Designed to Answer OLAP Queries with Low Latency." https://pinot.apache.org/. Retrieved on May 22, 2023. 7 pages.
Apache Pinot. "regexpExtract", https://docs.pinot.apache.org/configuration-reference/functions/regexpextract Retrieved on May 22, 2023. 3 pages.
Carlson, Peter. "Query Parser Syntax", Apache Lucene. https://lucene.apache.org/core/2_9_4/queryparsersyntax.html Date retrieved, May 18, 2023. 7 pages.
Chen, et al. (2023). "Data Compression for Real-Time Analytics." U.S. Appl. No. 18/313,731. US Patent and Trademark Office.
Cole, et al. "Dictionary Matching and Indexing with Errors and Don't Cares", Proceedings of the 36th annual Association for Computing Machinery Symposium on Theory of Computing, Jun. 13-16, 2004. https://www.researchgate.net/publication/221591874_Dictionary_matching_and_indexing_with_errors_and_don't_cares. 21 pages.
Github. "Compressed Log Processor." https://github.com/y-scope/clp/ Retrieved on May 22, 2023. 3 pages.
Github. "LZ4—Extremely Fast Compression." https://github.com/lz4/lz4. Retrieved on May 22, 2023. 4 pages.
Github. "Zstandard—Fast Real-time Compressions Algorithm." https://github.com/facebook/zstd#readme. Retrieved on May 22, 2023. 7 pages.
Rodrigues, et al. "CLP: Efficient and Scalable Search on Compressed Text Logs", 15th USENIX Symposium on Operating Systems Design and Implementation, Jul. 14-16, 2021, 17 pages.
Uber Blog. "Reducing Logging Cost by Two Orders of Magnitude Using CLP." https://www.uber.com/blog/reducing-logging-cost-by-two-orders-of-magnitude-using-clp/ Sep. 29, 2022. 17 pages.

* cited by examiner

DATA COMPRESSION FOR REAL-TIME ANALYTICS

FIELD

The present disclosure generally relates to performing data compression and data querying of compressed data using machine-learned models that are trained to encode, compress, and decode data. More particularly, the present disclosure is directed to using machine-learned models to compress and store data while allowing searching and analytics of the compressed data.

BACKGROUND

Log management platforms ingest event logs produced by applications and computer processes from a variety of sources and store the logs in a centralized location. For instance, an application may produce event logs for interactions that occur with one or all of its microservices. The application may transmit the logs to a logging platform, where the logs are ingested and stored in a database. Users of the application may query the logs from the database. This may also include querying the logs for data analytics purposes.

SUMMARY

Aspects and advantages of embodiments of the present disclosure will be set forth in part in the following description, or may be learned from the description, or may be learned through practice of the embodiments.

In an example aspect, the present disclosure provides an example computing system. The example computing system includes one or more processors and one or more non-transitory, computer readable medium storing instructions that are executable by the one or more processors to cause the computing system to perform operations. The example operations include receiving a plurality of log statements. The example operations include generating an intermediate representation of the plurality of log statements by parsing a log template and variables from the plurality of log statements into a columnar format. The example operations include generating a compressed intermediate representation wherein the compressed intermediate representation is associated with an index type. The example operations include storing the compressed intermediate representation in the columnar format based on the index type.

In some examples, the example computing system includes a first data compression model configured to receive the plurality of log statements and determine the index type, the index type indicative of a type of log statement of the plurality of log statements associated with the log template and the variables.

In some examples, the example computing system includes a second data compression model configured to receive the intermediate representation and generate a compressed intermediate representation, wherein the compressed intermediate representation is indicative of the plurality of log statements.

In some examples, the index type is associated with a data type, the data type indicative of a compressed form of the plurality of log statements.

In some example operations, parsing the log template and variables include determining one or more repetitive properties of the plurality of log statements. In some example operations, parsing the log template and variables include converting the plurality of log statements into the columnar format based on the repetitive properties. In some example operations, parsing the log template and variables include determining repetitive values and non-repetitive values associated with the one or more repetitive properties. In some example operations, parsing the log template and variables include storing the repetitive values as dictionary values and the non-repetitive values as non-dictionary values.

In some example operations, the dictionary values are dictionary encoded and indexed within the columnar format.

In some examples, the plurality of log statements are indicative of at least unstructured logs or structured logs.

In some examples, the columnar format includes at least three columns.

In some example operations, storing the compressed intermediate representation in the columnar format is associated with a universal schema.

In some example operations, the index type is modified to accommodate a high variance of structured log statements.

In some examples, the example computing system is associated with an analytical database.

In another aspect, the present disclosure provides an example computer-implemented method. The example computer-implemented method includes receiving a plurality of log statements. The example computer-implemented method includes generating an intermediate representation of the plurality of log statements by parsing a log template and variables from the plurality of log statements into a columnar format. The example computer-implemented method includes generating a compressed intermediate representation wherein the compressed intermediate representation is associated with an index type. The example computer-implemented method includes storing the compressed intermediate representation in the columnar format based on the index type.

In some implementations, the example method includes receiving, using a first data compression model, the plurality of log statements. In some implementations, the example method includes determining, using the first data compression model, the index type, the index type indicative of a type of log statement of the plurality of log statements associated with the log template and the variables.

In some implementations, the example method includes receiving, using a second data compression model, the intermediate representation. In some implementations, the example method includes generating, using the second data compression model, a compressed intermediate representation, wherein the compressed intermediate representation is indicative of the plurality of log statements.

In some implementations, parsing the log template and variables include determining one or more repetitive properties of the plurality of log statements. In some implementations, parsing the log template and variables include converting the plurality of log statements into the columnar format based on the repetitive properties. In some implementations, parsing the log template and variables include determining repetitive values and non-repetitive values associated with the one or more repetitive properties. In some implementations, parsing the log template and variables include storing the repetitive values as dictionary values and the non-repetitive values as non-dictionary values.

In some implementations, the dictionary values are dictionary encoded and indexed within the columnar format.

In some implementations, the plurality of log statements are indicative of at least unstructured logs or structured logs.

In some implementations, the columnar format comprises at least three columns.

In some implementations, storing the compressed intermediate representation in the columnar format is associated with a universal schema.

In another example aspect, the present disclosure provides for one or more example non-transitory computer-readable media storing instructions that are executable to cause one or more processors to perform operations. The example operations include receiving a plurality of log statements. The example operations include generating an intermediate representation of the plurality of log statements by parsing a log template and variables from the plurality of log statements into a columnar format. The example operations include generating a compressed intermediate representation wherein the compressed intermediate representation is associated with an index type. The example operations include storing the compressed intermediate representation in the columnar format based on the index type.

In an another example aspect, the present disclosure provides an example computing system. The example computing system includes one or more processors and one or more non-transitory, computer readable medium storing instructions that are executable by the one or more processors to cause the computing system to perform operations. The example operations include receiving, from a user computing device, a search query, wherein the search query is indicative of at least one log statement of a plurality of compressed log statements stored in a data repository. The example operations include analyzing, using a search algorithm, the search query to identify a user defined function, wherein the user defined function is indicative of one or more columns within the data repository. The example operations include parsing, using the search algorithm, the search query to convert the search query into one or more predicates, wherein the one or more predicates indicate a condition to satisfy the search query. The example operations include filtering, by the computing system, the plurality of compressed log statements based on the one or more predicates. The example operations include providing, to the user computing device for display on a user interface, a query result, wherein the query result is indicative of one or more compressed log statements that satisfy the condition.

In some examples, filtering the plurality of compressed log statements based on the one or more predicates includes determining an index type, the index type indicative of a type of log statement of the plurality of compressed log statements. In some examples, filtering the plurality of compressed log statements based on the one or more predicates includes searching a dictionary for corresponding dictionary entries, wherein the corresponding dictionary entries are indicative of the one or more compressed log statements that match the index type.

In some examples, searching the dictionary for the corresponding dictionary entries includes generating a text index over the dictionary.

In some examples, filtering the plurality of compressed log statements based on the one or more predicates includes analyzing a forward index to determine the corresponding dictionary entries.

In some examples, the example operations include analyzing, using the search algorithm, the search query to identify a log template and a variable, wherein the log template and the variable are parsed from the search query. In some examples, the example operations include filtering, by the computing system, the plurality of compressed log statements based on the log template and the variable.

In some examples the search algorithm decodes the one or more log statements of the plurality of compressed log statements that satisfy the one or more predicates.

In some examples, the data repository is an analytical database.

In some examples, the user defined function includes a match function, the match function indicative of one or more boolean functions that match encoded log text of the plurality of compressed log statements with an expression in the search query.

In some examples, the user defined function includes an extract function, the extract function indicative of one or more boolean functions that extracts encoded log text of the plurality of compressed log statements that match an expression in the search query.

In some examples, the user defined function includes a reconstruction function, the reconstruction function indicative of reconstructing an original log message from the plurality of compressed log statements that match an expression in the search query.

In another aspect, the present disclosure provides an example computer-implemented method. The example computer-implemented method includes receiving, from a user computing device, a search query, wherein the search query is indicative of at least one log statement of a plurality of compressed log statements stored in a data repository. The example method includes analyzing, using a search algorithm, the search query to identify a user defined function, wherein the user defined function is indicative of one or more columns within the data repository. The example method includes parsing, using the search algorithm, the search query to convert the search query into one or more predicates, wherein the one or more predicates indicate a condition to satisfy the search query. The example method includes filtering, by the computing system, the plurality of compressed log statements based on the one or more predicates. The example method includes providing, to the user computing device for display on a user interface, a query result, wherein the query result is indicative of one or more compressed log statements that satisfy the condition.

In some example implementations, filtering the plurality of compressed log statements based on the one or more predicates includes determining an index type, the index type indicative of a type of log statement of the plurality of compressed log statements. In some example implementations, filtering the plurality of compressed log statements based on the one or more predicates includes searching a dictionary for corresponding dictionary entries, wherein the corresponding dictionary entries are indicative of the one or more compressed log statements that match the index type.

In some example implementations, searching the dictionary for the corresponding dictionary entries includes generating a text index over the dictionary.

In some example implementations, filtering the plurality of compressed log statements based on the one or more predicates includes analyzing a forward index to determine the corresponding dictionary entries.

In some examples the method includes analyzing, using the search algorithm, the search query to identify a log template and a variable, wherein the log template and the variable are parsed from the search query. In some examples, the method includes filtering, by the computing system, the plurality of compressed log statements based on the log template and the variable.

In some example implementations the search algorithm decodes the one or more log statements of the plurality of compressed log statements that satisfy the one or more predicates.

In some example implementations, the data repository is an analytical database.

In some example implementations, the user defined function includes a match function, the match function indicative of one or more boolean functions that match encoded log text of the plurality of compressed log statements with an expression in the search query.

In some example implementations, the user defined function includes an extract function, the extract function indicative of one or more boolean functions that extracts encoded log text of the plurality of compressed log statements that match an expression in the search query.

In another example aspect, the present disclosure provides for one or more example non-transitory computer-readable media storing instructions that are executable to cause one or more processors to perform operations. The example operations include receiving, from a user computing device, a search query, wherein the search query is indicative of at least one log statement of a plurality of compressed log statements stored in a data repository. The example operations include analyzing, using a search algorithm, the search query to identify a user defined function, wherein the user defined function is indicative of one or more columns within the data repository. The example operations include parsing, using the search algorithm, the search query to convert the search query into one or more predicates, wherein the one or more predicates indicate a condition to satisfy the search query. The example operations include filtering, by the computing system, the plurality of compressed log statements based on the one or more predicates. The example operations include providing, to the user computing device for display on a user interface, a query result, wherein the query result is indicative of one or more compressed log statements that satisfy the condition.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
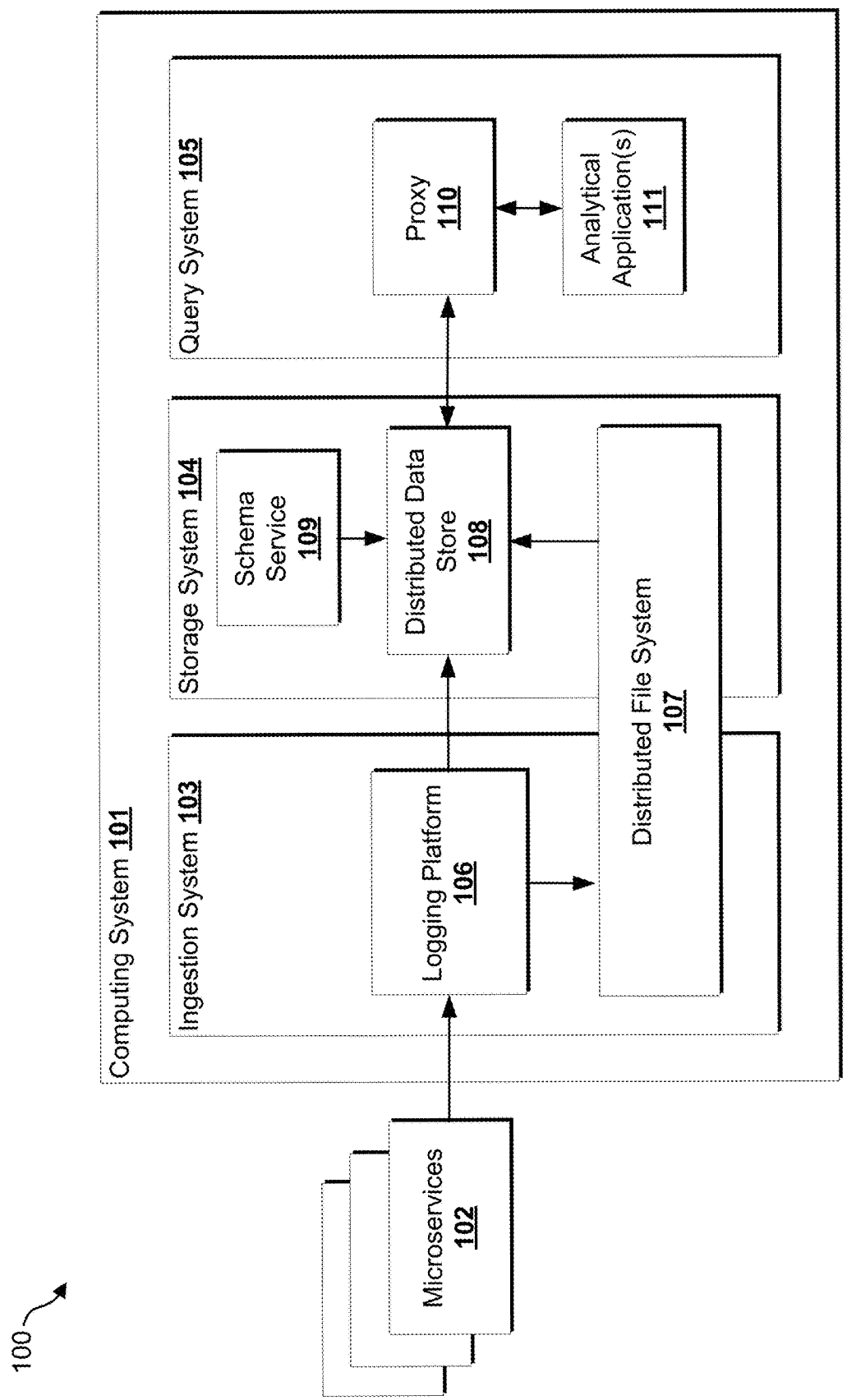
FIG. 1 depicts an example computing system according to example aspects of the present disclosure.

Generally, the present disclosure is directed to techniques for compressing data logs, storing the compressed data logs in an analytical database, and performing search queries over the compressed logs. Compression and storage techniques according to the present disclosure provide improved compression and storage of compressed data logs using a combination of compression algorithms to structure the logs into a columnar format, and native database operators to store the compressed data logs as native database columns. Query techniques according to the present disclosure provide improved retrieval of compressed data logs using user defined search functions as a predicate to parse the search query, filter the compressed data logs, and reconstruct the query result.

For example, a computing system (e.g., a computer-hosted logging platform) may obtain data logs that include log statements from systems or applications. The log statements may be in the form of unstructured logs or structured logs which may be generated over a period of time from a variety of systems. Examples of logs may include JSON (JavaScript Object Notation) or XML (Extensible Markup Language).

According to embodiments herein, the computing system may include a first data compression algorithm configured to analyze the log statements and determine a log template and variables from the log statements. A log template may include properties of log statements that are likely to be repetitive across the log data, and variables may be an associated value of the repetitive properties.

In some examples, the first data compression algorithm may determine an index type. An index type indicates the type of log statement and allows the log statement to be indexed with other log statements of the same log type. The first data compression algorithm may parse the log template and variables from the log statements into a columnar format and index the log statement based on the index type. In some examples, the first data compression algorithm may determine duplicate log templates and store the duplicate log templates as dictionary entries to deduplicate log statements with repetitive log templates. In some examples, parsing the log template and variables may include encoding the variable values. For example, the first data compression algorithm may generate an intermediate representation of the log statements by parsing the log template and variables into a columnar format and compressing the variables, by encoding the variable values. In some examples, a second data compression algorithm may receive the intermediate representation of the log statements and perform lossless data compression techniques to compress the intermediate representation. Lossless compression techniques may include generating and utilizing a model that maps input data to bit sequences that produce a shorter output than the input data.

The compressed intermediate representation may be ingested by a data ingestion system that determines the index type of each log statement and stores the intermediate representation in a storage system (e.g., online analytical processing (OLAP) database) based on the index type. For example, the compressed intermediate representation may include the encoded log template and variables of the log statements and may be further encoded as a dictionary in the storage system. A dictionary maps a database identifier (IDs) to the value of the encoded log template and variables to enable searching the storage system for the associated values with the IDs. In some examples, the OLAP database may include native columns that correspond to the columnar structure of the compressed intermediate representation. For example, the OLAP database may include an index type column that indicates the type of log statement detected by the first data compression algorithm. In some examples, the native columns enable search queries to filtered based on the index data type. In some examples, the native columns allow for further data compression.

According to examples, the storage system may receive a search query from a user. The search query may indicate specific log statements compressed in the intermediate representation that are stored in the storage system. In some examples, the search query may include one or more user defined functions (UDFs) that define the specific log statements desired by the user. A UDF accepts columns of input, performs actions on the input, and returns the result of those actions as a value. For example, the query system may include a search algorithm configured to analyze the search query and identify one or more UDFs by determining the search query defines one or more columns within the storage system. The UDFs may include actions such as matching, extracting, or constructing values of log statements stored in the defined columns of the storage system.

In some embodiments, a search model may convert the search query into one or more predicates that satisfy the actions defined in the UDFs. A predicate is an expression that evaluates to true, false, or unknown. For example, the search model may determine the search query includes a UDF that indicates a matching, extracting, or reconstructing action, for a specified index type column, and generate a predicate that evaluates each row of the specified index type column. In some examples, the storage system may filter through the specified index type column and return the values that satisfy the predicate. The returned values may be displayed on a user interface for or associated with the user. Example user interfaces may include a user interface displaying a dashboard, or a user interface coupled with an API (Application Programming Interface).

The technology of the present disclosure can provide a number of benefits and technical effects. For instance, the technology of the present disclosure can allow microservices to leverage the benefits of multi-step data compression techniques while also serving analytics on the compressed data. This can include structured data and unstructured data. As such, the technology can increase the storage capacity of analytical data stores and increase flexibility to accommodate a variety of log types without impacting latency due to decompressing the logs upon request. Moreover, by introducing an index type into the compression algorithm and introducing native columns in the analytical datastore that align to the output of the compression algorithm, search queries can more efficiently search the encoded data. The technology of the present disclosure can help to increase the storage capacity of analytical databases by increasing the compression ratio and increase the computing efficiency (e.g., processing, power, etc.) for search engines by reducing the need to decompress the compressed log data.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations may be made to the embodiments without departing from the scope of the present disclosure. For instance, features illustrated or described as part of one embodiment may be used with another embodiment to yield a still further embodiment. Thus, it is intended that aspects of the present disclosure cover such modifications and variations.

For example, the following describes the technology of this disclosure within the context of an event logging platform and analytical applications for example purposes only. As described herein, the technology described herein is not limited to an event logging platform or analytical applications and may be implemented for or within any event streaming platform and other data processors.

FIG. 1 depicts an example computing ecosystem according to example aspects of the present disclosure. The example computing ecosystem 100 may include microservices 102 which generate data logs and a computing system 101 that may include an ingestion system 103 to ingest the data logs, a storage system 104 which stores the data logs, and a query system 105 which allows analytical applications 111 to query the data logs.

With respect to examples as described herein, the system 100 may be implemented on a server, combination of servers, or a distributed set of computing devices which communicate over a network such as the Internet. For example, the system 101 may be distributed using one or more physical servers, virtual private servers, or cloud computing. In other examples, the system 100 may be implemented as a part of or in connection with microservices 102, where, for example, an application is architected into independent services that communicate over APIs (application programming interfaces). Microservices 102 may be deployed in a container (e.g., standalone software package for a software application) using a container service, or on VMs (virtual machines) within a shared network. A container service may be a cloud service that allows developers to upload, organize, run, scale, manage, and stop containers using container-based virtualization to orchestrate the respective actions. A VM may include virtual computing resources which are not limited to a physical computing device.

In some examples, the ingestion system 103 may include one or more systems and may be implemented using a virtual private cloud (VPC), container service, or may be deployed within a public cloud environment. For example, the ingestion system 103 may include a logging platform 106. In some examples, the logging platform 106 may be implemented using a container service. The logging platform 106 may include a distributed event store and streaming service. A distributed event store and streaming service may generate streaming data pipelines to allow for transmission of data between multiple systems. By way of example, the logging platform 106 may generate one or more data stream pipelines to allow data logs generated by microservices 102 to be transmitted (e.g., streamed) to a real-time online analytical processing (OLAP) database (e.g., distributed data store 108) where the data logs may be consumed for data analytics.

As further described herein, the ingestion system 103 may ingest data logs from microservices 102 that have subscribed to the logging platform 106. Data ingestion may include streaming various types of data logs from multiple sources (e.g., microservices) and storing the data logs in a single data store (e.g., distributed file system 107) to be accessed and analyzed by analytical applications 111 using a distributed data store 108. Data logs may include event logs, (e.g., logs that records network traffic and usage data), server logs (e.g., logs that track actions on a server), system logs (e.g., logs that occur within the operating system), or any type of log produced by a software application. In some examples, data logs may include structured, semi-structured, and unstructured logs. Structured data logs may include JSON (JavaScript Object Notation) logs. Semi-structured logs may include HTML (Hypertext Markup Language), XML (Extensible Markup Language), or any other markup languages. Unstructured data logs may include large text files including strings which are intended for human reading.

In some examples, the logging platform 106 may include clusters that allow the microservices 102 to subscribe (e.g., configure a cluster to receive stream event data logs) to the logging platform 106. For example, the logging platform 106 may consume (e.g., ingest) a data stream including data logs from a microservice 102 which subscribed to a designated cluster within the logging platform 106. The cluster may include one or more servers or containers and allow the microservice 102 to stream and store data logs based on a key value (e.g., a log type) and timestamp. In some examples, clusters may include topics. Topics may indicate a dedicated location within the cluster for a specific data stream for a microservice 102 and may be identifiable by a specific topic name. In some examples, the topic may be partitioned into segments. By way of example, a microservice 102 may stream data logs to a topic and the data logs may be partitioned (e.g., separated) into segments by the logging platform 106. The segments may be distributed and assigned to multiple servers across the cluster to allow for optimization of computing resources for the cluster. In some examples, segments may include data logs organized in a columnar format with dictionaries and indexes. Segments including data logs in the columnar format with dictionaries is further described with reference to FIGS. 2-3.

In some examples, a single microservice 102 may subscribe multiple times to the logging platform 106. For example, a microservice 102 may generate multiple types of data logs and subscribe to multiple topics across multiple clusters. In some examples, the respective data streams may be partitioned, and segments may be stored across various severs or containers of the respective clusters.

The computing system 101 may include a storage system 104. The storage system 104 may include one or more systems and may be implemented using a virtual private cloud (VPC), container service, or may be deployed within a public cloud environment. For example, the storage system 104 may include a metadata service 109, a distributed data store 108, and a distributed file system 107. The metadata service 109 may be a service in the form of software code that is used to define the names, data types, etc., for the columns of the distributed data store 108. In some examples, the metadata service 109 is deployed in a container. In some examples, the metadata service 109 may be deployed within the distributed data store 108. In other examples, the metadata service 109 may be deployed on a virtual machine.

The metadata service 109 may implement a universal schema for the storage system 104. For instance, the microservices 102 may generate high variance (e.g., diverse) log data. By way of example, the microservices 102 may generate structured, unstructured, and semi-structured data logs. In some examples, high variance data logs may be difficult to store in a single data store due to the difference in structure or format. In some examples, the metadata service 109 may implement a universal schema such that the high variance data logs may be uniformly stored within the storage system 104. For example, the ingestion system 103 may convert the data logs generated by the microservices 102 into a consistent format (e.g., columnar format) prior to storage in the storage system 104. In some examples, the universal schema may align to the consistent format generated by the ingestion system 103. For instance, the universal schema may create native columns within the storage system that match the columns of the consistent format generated by the ingestion system 103. In some examples, the native columns may allow for more efficient storage and querying of the data logs. An example, of data logs converted into a consistent format is further described with reference to FIG. 2.

In some examples, the metadata service 109 may include a schemaless implementation. For instance, the distributed datastore 108 may store high variance data logs in a non-tabular format. For example, the metadata service 109 may define one or more customized views of the data. In some examples, the customized view may be based on the type of log data (e.g., structured, unstructured, etc.). In some examples, the customized view may be based on the index type of the log data (e.g., compressed log data). In some examples, the customized view may be based on a plurality of index types. In some examples, the schemaless implementation may provide flexibility to store high variance logs which may generate high variance encodings.

The distributed data store 108 may be an online analytical processing data store (e.g., OLAP database). An online analytical processing data store may ingest data logs from data streams (e.g., the logging platform 106) or from batch data sources (e.g., the distributed file system 107) and allow analytical applications 111 to deliver data analytics by querying the data through a proxy 110. In some examples, the distributed data store 108 may be implemented using a container service. For instance, the distributed data store 108 may be deployed across multiple clusters of servers or containers.

The storage system 104 may include the distributed file system 107. A distributed file system 107 may be any computer network where data is stored on more than one node (e.g., virtual machine, cluster of virtual machines, servers, etc.). For instance, the distributed file system 107 may include various types of nodes for storing data and segments with differing requirements. In some examples, the distributed file system 107 may include software that manages files in a storage system. Example distributed file systems 107 may include software that manages files stored in a data lake, data warehouse, etc. In some examples, the distributed file system 107 may include severs associated with the distributed data store 108. For instance, the distributed file system 107 may include real-time servers which store real-time data that may be accessed by the distributed data store 108.

By way of example, the logging platform 106 may receive a data stream (e.g., data logs), from a microservice 102, determine the topic for the data logs is associated with real-time data and partition the topic into real-time segments. In some examples, the logging platform 106 may determine the topic is associated with real-time data based on previous or current queries of the same log type (e.g., key value) received by the distributed data store 108 from analytical applications 111. In other examples, the logging platform 106 may be configured to determine real-time data and partition real-time segments. The logging platform 106 may periodically store the real-time segments including data logs in the real-time servers within distributed file system 107. For instance, the distributed file system 107 may include and manage servers associated with the distributed data store 108.

In some examples, when the logging platform 106 stores real-time segments within the distributed file system 107, the logging platform may transmit a notification to the distributed data store 108 indicating that respective real-time segments have been stored within the real-time servers of the distributed file system 107. In some examples, when the distributed data store 108 receives a query for real-time data stored in the distributed files system 107, the distributed file system 107 may facilitate the query results. An example of the distributed data store 108 responding to query request for data log stored in the distributed file system 107 is further described with reference to FIGS. 4-5.

In some examples, the distributed file system 107 may be associated with the ingestion system 103 and the storage system 104. For instance, the ingestion system 103 may share computing resources with the distributed file system 107 and the storage system 104. In some examples, the distributed file system 107 may manage severs and data for the logging platform 106. For instance, the logging platform 106 may consume a data stream including data logs for offline processing. Offline processing may include converting the data logs to a consistent (e.g., columnar format) at a time later than ingestion. For instance, data logs which include log statements that do not require immediate processing may be stored in offline servers and processed at a time when ingestion traffic is low (e.g., offline). In some examples, offline processing may include processing the data logs by a remote computing system to prevent computing resource constraints for the ingestion system 103. Example offline data logs may include data which does not require a live network connection to be stored. For instance, data which is readily available such as a user's contact information is readily available and may be stored offline as opposed to an ephemeral connection with a user device. The ephemeral connection with a user device may generate data logs under an ephemeral and may be considered real-time data.

In some examples, the distributed file system 107 may store raw data logs. Raw data logs may include log messages which have not been partitioned into segments. For example, the distributed file system 107 may include raw data log severs for storing the raw data logs. In some examples, the logging platform 106 may receive a data stream and determine based on the key value that the logs should not be partitioned and directly store the raw data logs within the distributed file system 107. In some examples, offline data logs may include raw data logs.

By way of example, the logging platform 106 may receive a data stream (e.g., data logs), from a microservice 102, determine the topic for the data logs is associated with offline data and partition the topic into offline segments. Offline segments may include data streams where the data logs are not associated with a previous or current query. In some examples, the logging platform 106 may determine the topic is associated with offline data based on not receiving previous queries of the same log type (e.g., key value). In other examples, the logging platform 106 may be configured to determine offline data and partition offline segments. The logging platform 106 may periodically store the offline segments including data logs in the offline servers within distributed file system 107. For instance, the distributed file system 107 may include and manage servers associated with the distributed data store 108.

In some examples, the distributed file system 107 may include archive servers for storing archived segments. Archived segments may include data which has not been accessed or queried in a threshold time. For instance, the logging platform 106 may receive a data stream from microservices 102 and partition the topic into segments across a cluster. In some examples, the segments may not be accessed for a threshold time and the segments may be transmitted to the distributed file system 107 and stored in an offline server. In some examples, the segments may be stored in an archive sever, where the segments will be archived. In some examples, the logging platform 106 may be configured archive a data stream associated with a topic. For instance, the topic may include a key value (e.g., log type) which is rarely accessed. In some examples, the logging platform 106 may receive the data stream with an archive key value and directly partition segments within archive servers of the distributed file system 107.

In some examples, the logging platform 106 may facilitate the query results for the distributed data store 108. For example, the logging platform 106 may receive a data stream for a topic, partition segments across servers of the cluster. In some examples, the logging platform 106 may store the segments for a period of time before transmitting the segments to the distributed file system 107. For instance, the logging platform 106 may store the segments for a week before storing the segments in the distributed file system 107. In some examples, the distributed data store 108 may receive a query for data logs within a data stream that have been partitioned, segmented, and stored in the logging platform 106. In some examples, the distributed data store 108 may facilitate the query result by searching the logging platform 106. An example of the distributed data store 108 orchestrating the retrieval of data logs stored in the logging platform 106 is further described with reference to FIG. 5.

The computing system 101 may include a query system 105 for receiving and facilitating queries from analytical applications 111. The query system 105 may include one or more systems and may be implemented using a virtual private cloud (VPC), container service, or may be deployed within a public cloud environment. For example, the query system 105 may include a proxy 110 and may include analytical applications 111. The analytical applications 111 may include software used to analyze data. In some examples, the analytical applications 111 may include self-service dashboards. For instance, the analytical applications 111 may be used to measure and improve the performance of business operations or provide business intelligence by analyzing data logs produced by microservices 102. In some examples, analytical applications 111 may be associated with a computing device with a user interface. An example of analytical applications 111 and computing systems is further described with reference to FIG. 4.

The proxy 110 may include a server, cluster of servers, virtual machines, or a computing system which serves as an intermediary between a client (e.g., analytical applications 111) and a server (e.g., distributed data store 108). In some examples, the proxy 110 may be an API proxy. An API proxy may include an API gateway. In some examples, the API proxy may decouple the analytical application 111 from the backend services (e.g. microservices 102, logging platform 106, distributed data store 108, etc.). In some examples, the proxy 110 may facilitate API calls (e.g. query for data logs) between the analytical applications 111 and the storage system 104. For instance, the proxy 110 may handle identity management and authentication for query requests to ensure the security of the data logs.

By way of example, the analytical applications 111 may receive a query request for data logs. In some examples, the analytical applications may automatically generate a query request (e.g., on page load of the analytical application 111). The proxy 110 may receive the query and validate the user (e.g., user associated with the analytical application 111) and ensure that the analytical application 111 is authorized to access the data included in the query. In some examples, the proxy 110 may validate the identity of the user and authorize the access to the data by comparing user credentials or an API token to a security database. In some examples, the proxy 110 may validate the identity of the user and authorize the access to the data based on the classification of the data. For instance, the data may be public (e.g., anyone may access) and the proxy may authorize access to the data. The proxy 110 may transmit the query to the distributed data store 108 where the query results may be aggregated from the logging platform 106 and the distributed file system 107. In some examples, the distributed data store may transmit the query result through the proxy 110 to the analytical applications 111. An examples of the distributed data store 108 facilitating query requests is further described with reference to FIG. 5.

In some example, the query system 105 may automatically request data from the storage system 104. For instance, the query system 105 may be scheduled to refresh data in the analytical application 111 on a specified cadence. In some examples, the query system 105 may request data on page load of the analytical application 111. In other examples, the query system 105 may request data when data reflected in the analytical application 111 has reached a threshold age. For example, when data for an analytical application 111 has not been refreshed for 8 hours, the query system 105 may automatically request updated data.

Figure 2:
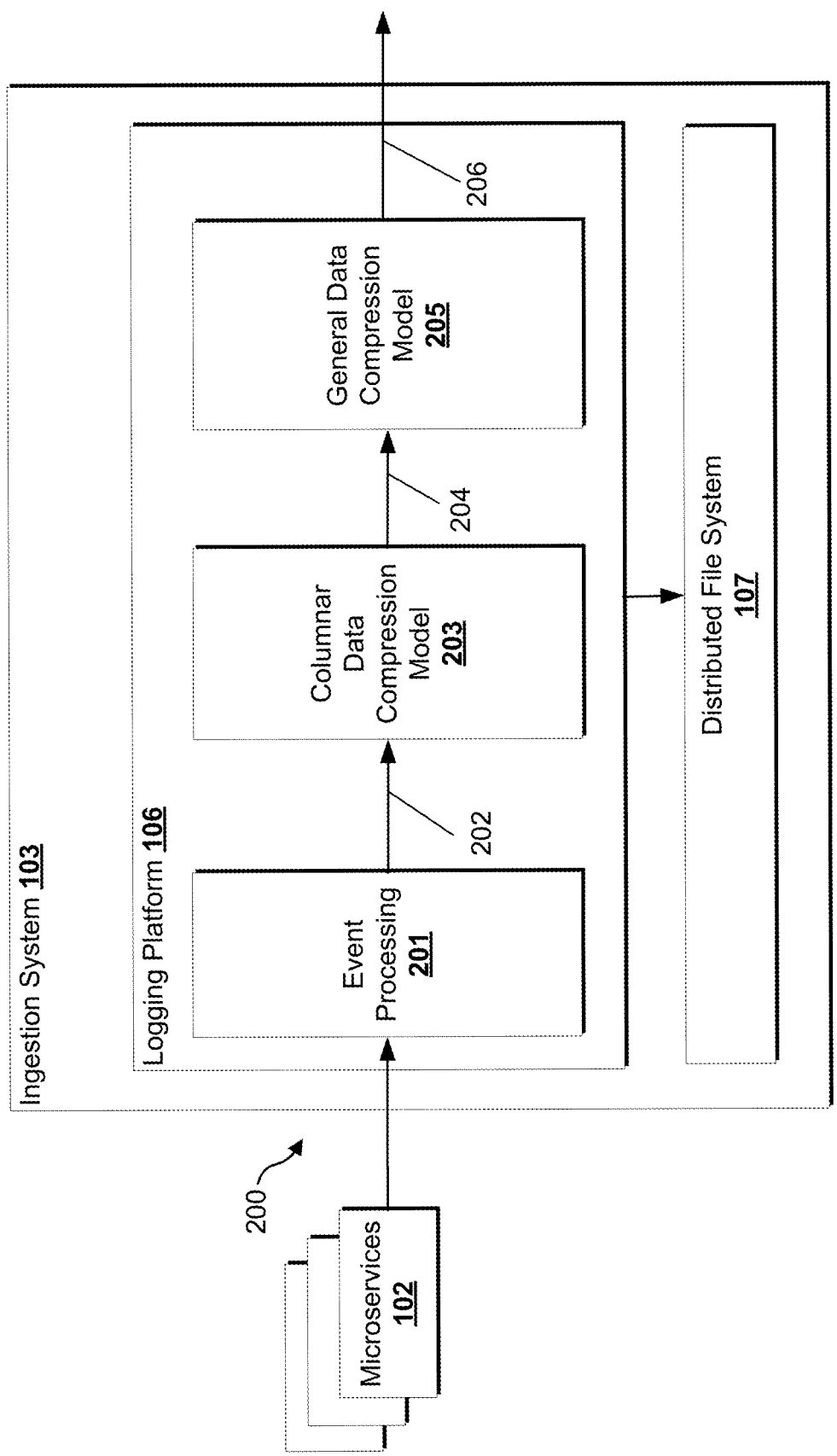
FIG. 2 depicts an example data pipeline according to example aspects of the present disclosure.

FIG. 2 depicts an example data pipeline according to example aspects of the present disclosure. The following description of data flow in data pipeline 200 is described with an example implementation in which data logs generated by microservices 102 are compressed using a plurality of data compression models prior to being stored in the logging platform 106, distributed file system 106, or being queried. Additionally, or alternatively, one or more portions of the dataflow pipeline 200 may be implemented in the storage system 104 or distributed file system 107.

In some implementations, the microservices 102 may generate data logs and stream (e.g., transmit) the data logs to the logging platform 106 of the ingestion system 103. The logging platform 106 may include an event processing system 201, a columnar data compression model 203, and a general data compression model 205.

The event processing system 201 may be software code that receives the data logs generated by the microservices 102 and generates data streaming pipelines. For instance, the event processing system 201 may include one or more servers and nodes within a cluster that runs software which generates the data streaming pipelines. In some examples, the nodes may be processors which may be used to perform actions on the data logs received from the microservices 102. For example, the nodes (e.g., brokers) may be used to manage the clusters. In some examples, the nodes may allow the software to write data streams including data logs to topics and allow analytical applications 111 to read from topics using the distributed data store 108.

In some examples, writing data to topics may include publishing data in a designated location (e.g., topic) within a cluster. In some examples, the topics may be partitioned into segments and stored in one or more servers across a cluster of the logging platform 106. In some examples, reading data from a topic may include facilitating query requests. For instance, the distributed data store 108 may read data stored segments with in the logging platform 106 to facilitate query requests. In some examples, the distributed data store 108 may provide the data logs read from the segments within the logging platform 106 to the analytical applications 111. An example, of the distributed data store 108 reading data from topics for analytical applications 111 is further described with reference to FIG. 5.

Returning to FIG. 2, the event processing system 201 may generate the data streaming pipelines and trigger a plurality of data compression models to compress the data logs within the data stream 202 as they are being written to one or more topics. For instance, the logging platform 106 may utilize one or more trained machine-learned models such as a columnar data compression model 203 and a general data compression model 205.

In an embodiment, the columnar data compression model 203 may be an unsupervised trained model configured to receive a plurality of data logs from the data stream 202, analyze the data logs and identify a log template and variables within the data logs. In some implementations, the columnar data compression model 203 may parse the log template and variables from the data logs into a columnar format. In some examples, the columnar data compression model 203 may include one or more trained machine-learned models. For instance, the columnar data compression model 203 may include a trained machine-learned model configured to analyze data logs and generate an intermediate representation of structured and unstructured logs. In some examples, the columnar data compression model 203 may include a trained machine-learned model 203 configured to analyze data logs and generate an intermediate representation of semi-structured data logs. In other examples, the columnar data compression model 203 may be trained to analyze data logs and generate an intermediate representation of any type of data log.

The columnar data compression model 203 may be or otherwise include various trained machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. In some examples, the columnar data compression model 203 may be any model that maps input data to bit sequences that produces a shorter output than the input data and structures the data in a columnar-oriented manner.

The columnar data compression model 203 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using pre-determined bit sequences. As further described herein, the training data may include pre-determined bit sequences which represent raw data. In some examples the pre-determined bit sequences reduce the amount of storage required to store the raw data. In some examples, the training data may include simulated training data (e.g., training data obtained from simulated scenarios, inputs, configurations, large data sets, etc.).

Additionally or alternatively, the model trainer(s) may perform unsupervised training techniques using computer generated bit-sequences. By way of example, the model trainer(s) may train one or more components of a machine-learned model to perform data compression through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques. In some implementations, the model trainer(s) may perform generalization techniques to improve the compression ratio of raw data to bit sequence.

Returning to FIG. 2, the event processing system 201 may output the data stream 202 including the data logs to the columnar data compression model 203. In some examples, the data stream 202 may include the raw data logs. In other examples, the data stream 202 may include log statements. For instance, the data logs may include a plurality of log statements. Log statements may include metadata describing an event or action that occurred within software code. By way of example, log statements, may indicate that a user interacted with an application (e.g., one or more microservices 102). The interaction may include actions taken by the user such as making a request for services, updating a request for services, etc. In some examples, interactions may include internal tasks generated and executed by microservices 102 in response to a user's action.

In some examples, the microservices 102 may generate a log statement that describes the specific interaction. In other examples, the log statement may describe a series of interactions. Log statements may indicate metadata such as the task that was created an executed in response to the interaction, the time taken to execute the associated task, the time in which the interaction was initiated, etc. The log statements may include similar fields for recording similar metadata. For instance, log statements generated for an interaction where a user requests a service may include the same fields and metadata for log statements generated for an interaction where a user cancels a service request. The columnar data compression model 203 may analyze the log statements within the data stream 202 and identify repetitive properties across the data logs. Repetitive properties may include repetitive fields or repetitive values across a plurality of log statements.

In some examples, log statements may indicate a log type. For instance, log types may be a field included in the log statement that indicates the type of data log. By was of example, microservices 102 may generate multiple types of data logs. The type of data log may indicate that the log was generated by a specific microservice 102 or indicate that a similar interaction occurred. In some examples, log statements of the same log type may include the same fields and capture the same metadata. In some examples, the log data may include a plurality of log statements of the same log type. In some examples, the log data may include a plurality of log statements of varying log types. In some examples, data logs which include logs statements of the same type may include repetitive fields and repetitive metadata. In other examples, data logs which include log statements of varying log types may also include repetitive field and repetitive metadata.

In some examples, the fields within a log statement may include variables (e.g., data which populates the field. Example variables may include integers, text strings, floating-point numbers, encoded values, etc. In some examples, the variables across a plurality of log statements may be the same. For instance, a log statement may include a log type field that indicates the log is a has been generated as a result of "uploading data". In some examples, the log statement would include the log type field and the "uploading data" variable. In some examples, multiple microservices 102 may perform the task of "uploading data" and generate a log statement including a log type field with a variable of "uploading data". In some examples, microservices 102 may generate several log statements which include repetitive fields. In some examples, microservices 102 may generate several log statement which include repetitive fields and variables.

In some examples, the index type may be associated with data type. For example, the variables may be indexed. In some examples, the log statements may be index based on the data type (e.g., the type of variable value). For example, log statements may include a timestamp field and include integer values which represent the day and time. In some examples, the log statements may be index based on integer data types such that the timestamp field may be searched more efficiently. For example, a data type may indicate a the type of data stored within a column. In other examples, a plurality of index types may be associated with a data type.

In some examples, the columnar data compression model 203 may utilize the repetitive qualities of the log statements to perform data compression. For instance, the columnar data compression model 203 may iterate through the log statements to determine one or more repetitive properties (e.g., fields and variables) of the plurality of log statements within the log data and generate a log template. A log template may include one or more repetitive fields across the plurality of log statements. In some examples, the columnar data compression model 203 may extract (e.g., parse) the log templates from the plurality of log statements and store the repetitive values in a dictionary. A dictionary may store log templates (e.g. repetitive grouping of fields within a log statement) to perform deduplication. For instance, the columnar data compression model 203 may iterate through the plurality of log statements, identify a log template and store the log template in the dictionary. As the columnar data compression model 203 iterates through log statements, the same log template may be identified. In some examples, the columnar data compression model 203 may determine the same log template identified across recently processed log statements has already been added to the dictionary and may avoid generating a duplicate log template entry in the dictionary.

In some examples, the columnar data compression model 203 may determine non-repetitive properties across the plurality of log statements. For instance, the non-repetitive properties may include variables or fields which are unlikely to be repeated in a consistent manner across the plurality of log statements. By way of example, the log statements may include a similar field that indicates the time taken for a task to be completed (e.g., "operation took" field). In some examples, the field which stores the variable time taken to execute the task may vary across the plurality of logs. For instance, latency changes, network disruptions, or application errors may effect the time taken to execute the same task. In some examples, the columnar data compression model 203 may store the non-repetitive values in the dictionary as non-dictionary values.

In some examples, the non-dictionary variables may be used to generate consistent bit sequences for variables which equal the non-dictionary variable. For instance, a task which takes 0.335 seconds may not be consistent across a plurality of log statements and may be stored as a non-dictionary variable. In some examples, the columnar data compression model 203 may encode (e.g., generate a bit sequence) 0.335 seconds. In some examples, the encoding may reduce the amount of storage needed to store the variable 0.335 seconds. For instance, the columnar data compression model 203 may represent 0.335 seconds as 01. In some examples, the columnar data compression model 203 may iterate through log statements and identify the variable 0.335 seconds and consistently encode (e.g., encoding scheme) the variable to 01.

In some examples, the columnar data compression model 203 may determine the log template and parse the log template from the plurality of log statements. By way of example, the columnar data compression model 203 may parse the plurality of log statements into a timestamp, a list of variable values, and the log type. In some examples, each of the plurality of log statements within the log data may include a time stamp, variables, and a log type. In some examples, the columnar data compression model 203 may parse the plurality of log statements into a columnar format.

Figure 3:
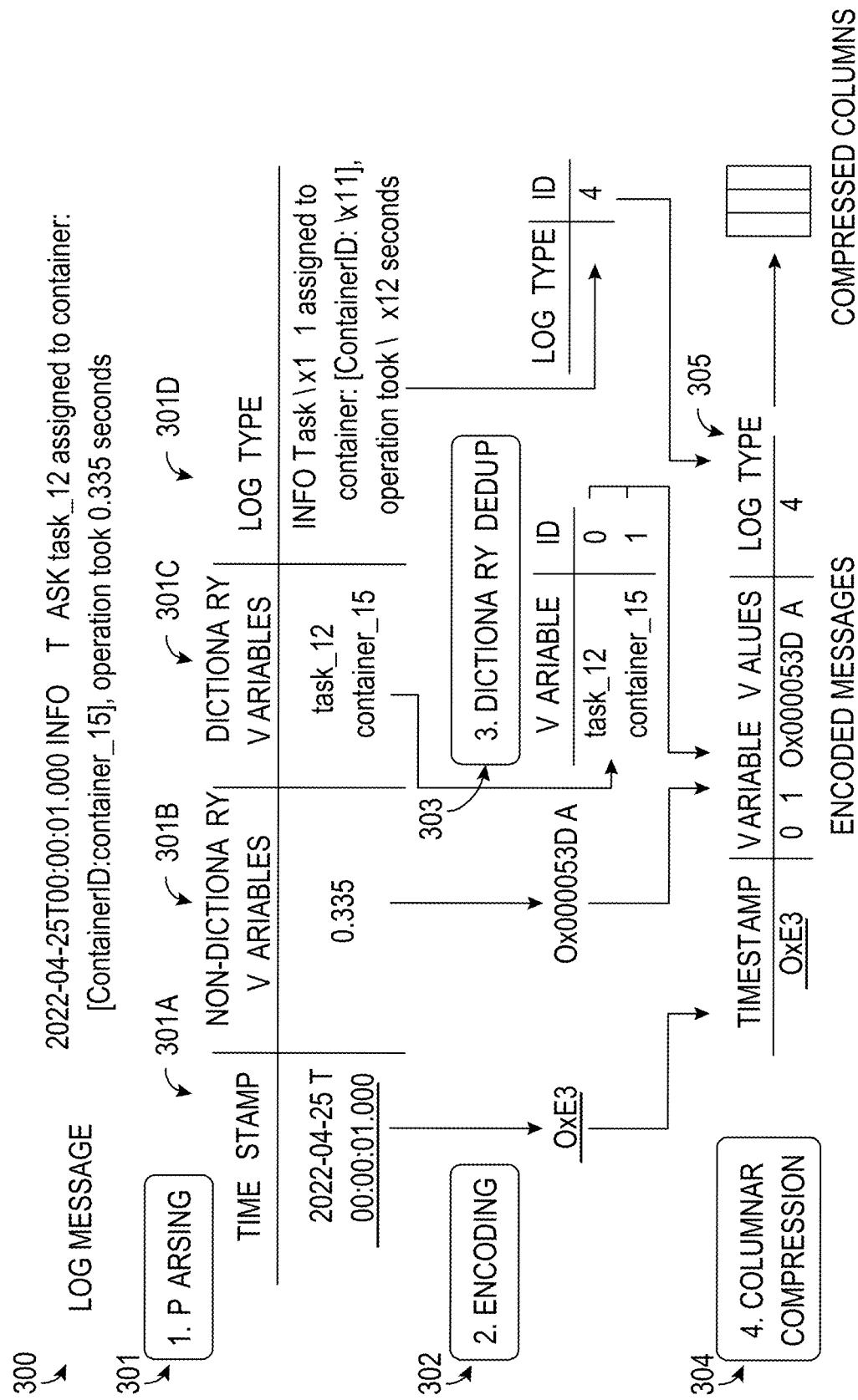
FIG. 3 depicts an example data compression technique according to example aspects of the present disclosure.

For example, as depicted in FIG. 3, the columnar data compression model 203 may parse log statements into a columnar format. For instance, the example log statement 300 may include a plurality of fields and variables. In some examples, the log statement 300 may be generated by one or more microservices 102. In other examples, the log statements 300 may be included in data logs within a data stream 202.

In some examples, the columnar data compression model 203 may analyze the log statement 300 and determine a log template. For instance, the example log statement 300 may include a timestamp 301A, a non-dictionary value 301B, a dictionary variable 301C, and a log type 301D. In some examples, the columnar data compression model 203 may determine the log template by analyzing a plurality of log statements 303. In some examples, the columnar data compression model 203 may be configured to determine the log template. For instance, the columnar data compression model 203 may be trained to deterministically identify the log template based on known repetitive properties across the plurality log statements 303 generated by microservices 102.

Returning to FIG. 3, the columnar data compression model 203 may perform a parsing method 301 to parse the timestamp 301A, non-dictionary variables 301B, dictionary variables 301C, and log type 301D into columns. In some examples, the log template may be the timestamp 301A, non-dictionary variables 301B, dictionary variables 301C, and log type 301D columns parsed from the log statement 300. In some examples, the columnar structure may include column names which indicate the variables which will be stored in the column. For instance, the non-dictionary variables 301B column may indicate the name of the column include the non-repetitive variable 0.335. In some examples, the columnar data compression model 203 may iterate through the plurality of log statements included in the data stream 202 and perform the parsing method 301 to parse the log template from the log statements 300.

In some examples, the columnar data compression model 203 may perform an encoding method 302 to encode the values of the log template. Encoding the values may include converting the values into a sequence of characters (e.g., letters, numbers, punctuations, symbols, etc.). For instance, the columnar data compression model 203 may generate a bit sequence (e.g., using an encoding scheme) which consistently converts the column values into one or more characters that represents the value using less characters than the original value. By way of example, the encoding method 302 may encode the variable "2022-04-25T 00:00:01:000" to "0xE3". The encoded value of "0xE3 includes fewer characters than "2022-04-25T 00:00:01:000" and requires less storage capacity to store. In some examples, the columnar data compression model 203 may iterate through each column and encode each value. For instance, the encoding method 302 may compress the original variable values of the log statement in the columnar-oriented manner associated with the log template.

In some examples, the columnar data compression model 203 may perform a dictionary deduplication method 303. For instance, the columnar data compression model 203 may determine that the dictionary variables 301C have already been stored in the dictionary. In some examples, the columnar data compression model 203 may determine that the dictionary variables 301C have not been stored in the dictionary. In some examples, the columnar data compression model 203 may perform the dictionary deduplication method by assigning the dictionary values 301C a unique id. By way of example, the dictionary may include two levels. The first level may include a dictionary variable schema which maps each dictionary value to a unique id. The unique id may indicate a separate location where the actual variable is stored. For instance, the dictionary variable 301C may include the "task_12" and "container_15 variables". In some examples, "task_12" may be mapped to the id "0" and "container_15" may be mapped to the id "1". The ids may point to a separate location where the variables "task_12" and "container_15 variables" are located. For instance, dictionary values may be organized to store similar data together. For instance, dictionary values may be highly repetitive across the plurality of log statements. In some examples, the unique id may indicate a variable value such that the repetitive value does not need to be stored each time that it appears in a log statement. In some examples, the dictionary stores the variable value one time and assigns the unique id each time the variable value appears to avoid duplicating the storage of the same value.

In some examples, the columnar data compression model 203 may generate an intermediate representation by performing the parsing method 301, the encoding method 302, and the dictionary deduplication method 303 across a plurality of log statements 300. For instance, the intermediate representation may include a representation of the log statement 300 which uses less characters (e.g., compressed) than the raw (e.g., initial) log statement. For example, the intermediate representation may be an encoded message 305. The encoded message 305 may include three columns with values which represent the log statement 300. In some examples, the encoded message 305 may include more than three columns. In other examples, the encoded message 305 may include less than three columns. In some examples, the encoded message may be a compressed representation of the log statement 300 in a column-oriented manner.

The columnar data compression model 203 may output the intermediate representation (e.g., the encoded message 305) and a general data compression model 205 may be utilized to further compress the intermediate representation. For instance, the columnar compression method 304 may be executed by a general data compression model 205.

Returning to FIG. 2, the logging platform 106 may include the general data compression model 205 configured to receive output from the columnar data compression model 203 and perform lossless data compression. Lossless data compression may include any technique for compressing data while allowing for reconstruction of the compressed data with no loss of information. For instance, the columnar data compression model 203 may output an intermediate representation 204 of a plurality of log statements. In some examples, the intermediate representation 204 may include an encoded message (e.g., encoded message 305). In other examples, the intermediate representation 204 may include a plurality of encoded messages 305. For instance, the intermediate representation 204 may include one or more compressed log statements in the column-oriented structure.

The general data compression model 205 may be or otherwise include various trained machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. In some examples, the general data compression model 205 may be any model that maps input data to bit sequences that produces a shorter output than the input data and compresses a columnar structure.

The general data compression model 205 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using pre-determined bit sequences. As further described herein, the training data may include pre-determined bit sequences which represent encoded data. In some examples the pre-determined bit sequences reduce the amount of storage required to store the encoded data. In some examples, the training data may include simulated training data (e.g., training data obtained from simulated scenarios, inputs, configurations, large data sets, etc.).

Additionally, or alternatively, the model trainer(s) may perform unsupervised training techniques using computer generated bit-sequences. By way of example, the model trainer(s) may train one or more components of a machine-learned model to perform data lossless compression through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques. In some implementations, the model trainer(s) may perform generalization techniques to improve the compression ratio of encoded data to bit sequence.

Returning to FIG. 2, the general data compression model 205 may perform lossless data compression by further encoding the intermediate representation (e.g., encoded message 305). For instance, general data compression model 205 may include an encoding method which generates a bit sequence to represent the encoded values of the intermediate representation 204. In some examples, the columnar-oriented structure of the intermediate representation allows for increased compression. For instance, the intermediate representation 204 may compress and organize the plurality of log statements such that similar data is encoded together. For example, generating bit sequences for dissimilar data may introduce complexity and result in lower compression ratios.

By way of example, the general data compression model 205 may encode the encoded messages 305 included in the intermediate representation 204. The general data compression model 205 may generate a bit sequence which is use fewer characters than the encoded value within each column of the compressed intermediate representation 204. For instance, the compressed intermediate representation 204 may include a variable value of "0x00053DA". The general data compression model 205 may generate a bit sequence of "53D" to represent the variable value.

In some examples, the general data compression model 205 may encode the variables in a column of the compressed intermediate representation 204 using a similar encoding pattern (e.g., encoding scheme) due to the similar characteristics of the values. For instance, the general data compression model 205 may include an encoding scheme that encodes the "0x00018LK" as "18L" due to the similar characteristics of the encoded values such as character length. In some examples, the intermediate representation 204 includes encoded values which include align to a consistent encoding scheme that results in consistent bit sequences for similar types of data. In some examples, the consistent encoding scheme is a result of the columnar data compression model 203. In some examples, the consistency of similarly encoded data allows for greater data compression by the general data compress model 205.

In some examples, the encoding scheme may be used to decode the data. For instance, the same pattern utilized to generate the bit sequence may be used to decode (e.g., convert the bit sequence to the variable value) the intermediate representation 204. In some examples, the encoding scheme may be used to query the compressed data logs. For instance, an analytical application 111 may receive or generate a query for the compressed data logs. The encoding scheme and dictionary may be used to retrieve the queried values without decompressing the data. An example of the distributed data store 108 facilitating queries for compressed data logs is further described with reference to FIGS. 5-6.

In some examples, the general data compression model 205 may further compress the intermediate representation 204. By way of example, the general data compression model 205 may receive the intermediate representation 204 and iterate through the values of each column and encode the values such that the further encoded values include less characters than the encoded values of the intermediate representation 204. In some examples, the general data compression model 205 may compress the intermediate representation 204 within the columnar structure. For instance, the general data compression model 205 may utilize and encoding scheme that encodes similar data more efficiently than dissimilar data. In some examples, the intermediate representation 204 may store similar data within the same column. In some examples, the general data compression model 205 may increase the compression ratio between the encoded message 305 of the intermediate representation 204 and the further encoded compressed columns.

In some examples the genera data compression model 205 may compress the dictionary with the intermediate representation 204. For instance, the intermediate representation 204 may include a dictionary which store dictionary variables 301C and non-dictionary variables 301B. In some examples, the dictionary including the dictionary variables 301C and non-dictionary variables 301B may be encoded and compressed to allow for easier retrieval and querying of the compressed columns (e.g., compressed data logs). An example, of querying compressed data logs utilizing the compressed dictionary is further described with reference to FIGS. 5-6.

The general data compression model 205 may compress the intermediate representation 204 and output a compressed intermediate representation 206. In some examples, the compressed intermediate representation 206 may include an encoded representation of the intermediate representation 204 which requires less storage. For instance, the compressed intermediate representation 206 may include further compressed variable values in a columnar-oriented manner. In some examples, the general data compression model 205 may output the compressed intermediate representation 206 and write the compressed intermediate representation 206 to a topic within the logging platform 106.

By way of example, the logging platform 106 may include clusters that allow the microservices 102 to subscribe (e.g., configure a cluster to receive stream event data logs) to the logging platform 106. For example, the logging platform 106 may consume (e.g., ingest) a data stream including data logs from a microservice 102 which subscribed to a designated cluster within the logging platform 106. The event processing system 201 may ingest the data stream including a plurality of log statements 300 within the data logs. In some examples, the event processing system 201 may generate and output a data stream 202 to write the data logs to one or more topics within a cluster of the logging platform. In some examples, the event processing system 201 may trigger the columnar data compression model 203 to generate an intermediate representation 204. In some examples, the columnar data compression model 203 may output the intermediate representation 204 and trigger the general data compression model 204 to further compress the intermediate representation 204 and output a compressed intermediate representation 206 of the data stream including the plurality of log statements.

The logging platform 106 may write the compressed intermediate representation 206 to a topic within a cluster of the logging platform. For instance, the logging platform 106 may include one or more servers or containers and allow the microservice 102 to stream and store data logs based on a key value (e.g., a log type) and timestamp. In some examples, the clusters may include topics that indicate a dedicated location within the cluster for a specific data stream for a microservice 102. In some examples, the topics may store the data stream as columns. For instance, columnar structure of the intermediate representation 204 generated by the columnar data compression model 203, may be further compressed by the general data compression model 205 in the columnar-oriented manner and stored in the topic in the columnar oriented manner.

In some examples, the metadata service 109 may determine the table structure (e.g., schema) across the clusters. For instance, the metadata service 109 may implement a universal schema such that native columns within the clusters align to the columns of the compressed intermediate representation 206. In some examples, the index type (e.g., type of log statements) may be included in the universal schema and allow the compressed intermediate representation 206 to be stored based on a compressed log index. In some examples, a plurality of index types may be included in the universal schema. In some examples, the native columns which align to the columns of the compressed intermediate representation 206 may allow for searching of the compressed log statements. An example of the compressed log index is further described with reference to FIG. 6.

In some examples, the topic may be partitioned into segments. By way of example, compressed intermediate representation 206 may be written (e.g., stored) to a topic and the compressed intermediate representation 206 may be partitioned (e.g., separated) into segments by the logging platform 106. Partitioning may occur when a segment has reached its storage capacity. For instance, a topic may include 10 GB of storage capacity on sever 1 of a cluster, and 5 GB of storage server 2 of the cluster. A topic may include locations on both sever 1 and sever 2. By way of example, the logging platform 106 may write data to a topic on server 2 and partition a segment onto server 1 when server 2 reaches its storage capacity. In some examples, the segments may be distributed and assigned to multiple servers across the cluster to allow for optimization of computing resources for the cluster. In some examples, segments may include the compressed intermediate representation 206 (e.g., plurality of compressed log statements) organized in a columnar format.

In some examples, the logging platform 106 may periodically store the segments including the compressed intermediate representation 206 in the distributed file system 107. For instance, the distributed file system 107 may include various types of nodes for storing data and segments with differing requirements. In some examples, the logging platform 106 may reach capacity on all of its clusters and store segments in the distributed file system 107. In some examples, the logging platform 106 may directly store segments in the distributed file system 107. For instance, the distributed file system 107 may include servers associated with the logging platform 106. In some examples, the servers may directly receive the compressed intermediate representation 206 from the logging platform 107 by directly storing the segments in associated servers of the distributed file system 107.

In some examples, the storage system 104 may receive the compressed intermediate representation 206. For instance, the distributed data store 108 may receive a query from one or more analytical applications 111 and request the compressed intermediate representation 206 from segments stored in the logging platform 106. In some examples, the storage system 104 may include the distributed file system 107. For instance, the distributed file system 107 may include one or more servers associated with the distributed data store 108. In some examples, the ingestion system 103 and the storage system 104 may share computing resources across the distributed file system 107. For instance, the distributed file system 107 may include software which manages storage. In some examples, the distributed file system 107 may manage storage for both the ingestion system and the storage system 104. By way of examples, the logging platform 106 may output the compressed intermediate representation 206 and store the compressed intermediate representation 206 (e.g., segments) in servers associated with the distributed data store 108 within the distributed file system 107. In some examples, the distributed data store 108 may access the compressed intermediate representation 206 to facilitate query requests. An example of the distributed data store 108 accessing the compressed intermediate representation 206 to facilitate query requests is further described with reference to FIGS. 4-5.

Figure 4:
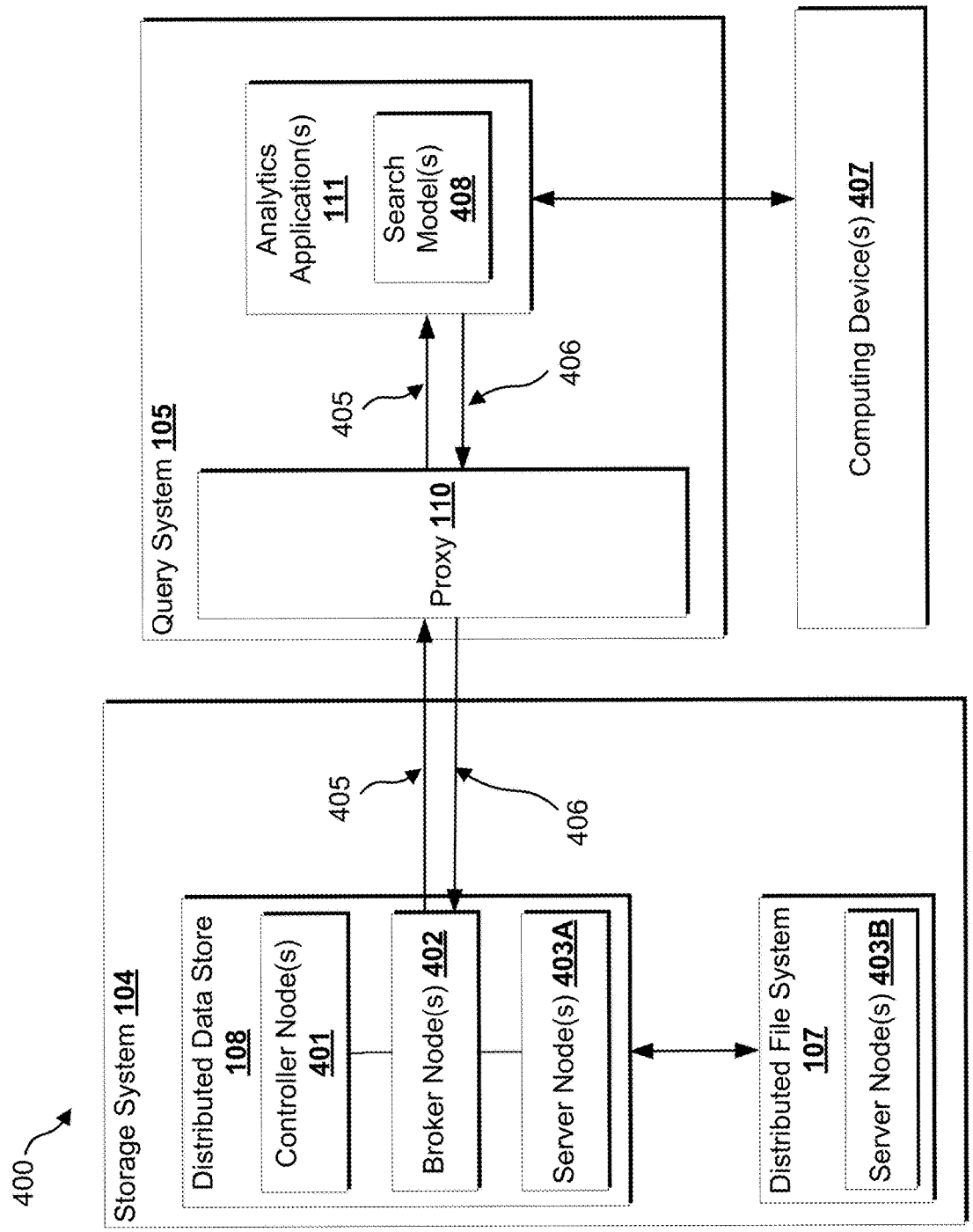
FIG. 4 depicts an example computing system according to example aspects of the present disclosure.

FIG. 4 depicts an example computing system according to example aspects of the present disclosure. The example computing ecosystem 400 may include the storage system 104, the query system 105, and one or more computing devices 407 associated with the one or more analytical applications 111. The analytical applications 111 may include software used to analyze data. In some examples, the analytical applications 111 may include self-service dashboards, analytical graphs, interactive charts, etc. For instance, the analytical applications 111 may be used to measure and improve the performance of business operations or provide business intelligence by analyzing data logs (e.g., compressed log statements) produced by microservices 102. In some examples, analytical applications 111 may be associated with one or more computing device 407. For instance, the computing device 407 may be any computing system which displays the analytical applications 111 via a user interface. The computing device 407 may be a mobile computing device, such as a smartphone, tablet computer, laptop computer, VR or AR headset device, and the like. As such, the computing device 407 may include components such as a microphone, a camera, a satellite receiver, and a communication interface to communicate with external entities using any number of wireless communication protocols. In some examples, the computing device 407 may store the analytical application 111 in a local memory. In some examples, the memory may store additional applications executable by one or more processors of the computing device, enabling access and interaction with one or more servers (e.g., query system 105) over one or more networks.

In some examples, the computing device 407 may communicate with the query system 105 over one or more networks. By way of example, the analytical applications 111 may be stored on one or more server of the query system 105. In some examples, the computing devices 407 may communicate with the analytical applications 111 by communicating over one or more networks. In some examples, the computing devices 407 may display the analytical applications 111 on the user interface of the computing devices 407 by communicating over the one or more networks. For instance, the computing devices 407 may access and display the analytical applications 111 over a network such as the internet.

In some examples, the computing devices 407 may be associated with one or more users. For instance, a user may interact with the analytical applications 111 displayed on the user interface of the computing device 407. In some examples, the user may submit a search query 406 for compressed data logs stored in the storage system 104. In some examples, the analytical applications 111 may generate a search query 406 based on the query. In other examples, the analytical applications 111 automatically generate a search query 406. For instance, upon accessing (e.g., page load) the analytical applications 111, the analytical applications 111 may generate a search query 406 to retrieve data needed to populate one or more user interface elements (e.g., analytical graphs, charts, dashboards, etc.) of the analytical applications 111. In some examples, the analytical applications 111 may receive the query result 405 including compressed data logs and perform data analytics over compressed data logs.

For instance, the analytical applications 111 may include one or more search models 408. The search model 408 may be or may otherwise include various machine-learned models. In an embodiment, the search model 408 may include neural networks (e.g., deep neural networks) or other types of machine-learned models, including non-linear models and/or linear models. Neural networks may include feedforward neural networks, recurrent neural networks (e.g., long short-term memory recurrent neural networks), convolutional neural networks or other forms of neural networks.

In some examples, the search model 408 may be configured to receive a search query 406, identify one or more user defined functions, and convert the search query into one or more predicates that satisfy the search query. For example, the search model 408 may be configured to analyze the search query 406 to identify the log template and variables. For instance, the log template may align to native columns included in tables of the storage system 104. By way of example, the compressed intermediate representation 206 may be stored in a columnar-oriented manner based on a log template and variables parsed from the plurality of log statements. In some examples, the search query 406 may include search parameters associated with the log template and variables. In some examples, the search model 408 may determine the search parameters are associated with the log template and variables and parse the log template and variable from the search query 406.

In some examples, the search parameters may be associated with one or more user defined functions (UDF). A user defined function may accept columns of input, perform actions on the input, and return the result of those actions as a value. By way of example, the search model 408 may be configured to analyze the search query 406 and identify one or more UDFs by determining the search query 406 defines one or more columns (e.g., log template) and values (e.g., variables). In some examples, the log template and variables are indicative of at least one log statement within a segment on a server node stored in the distributed data store 108 (e.g., server node 403A) or the distributed file system 107 (e.g., server node 403B). In some examples, the UDFs may include actions such as matching, extracting, or constructing values of log statements included in the compressed log template of the segments (e.g., compressed intermediate representations 206).

In some embodiments, the search model 408 may convert the UDFs into one or more predicates that satisfy the actions defined in the UDFs. A predicate is an expression that evaluates to true, false, or unknown. For instance, a predicate may utilize boolean logic to formulate statements which evaluate to true, false, or unknown. For example, the search model 408 may determine the search query 406 includes a UDF that indicates a matching, extracting, or reconstructing action for a specified index type column of a segment, and generate a predicate that evaluates each row (e.g., by performing the specified action) of the specified index type column within the segments of the same index type. In some examples, the search model 408 may determine a UDF for a plurality of index types.

In some examples, the search query 406 may include a UDF that indicates a match function. In some examples, the search model 408 may convert the search query into one or more predicates that matches the specified column or variable. By way of example, the compressed intermediate representation 206 may be stored in segments across one or more server nodes. The segments may include columns defined by the columnar data compression model 203 based on parsed log template and variables. In some examples, the match function may indicate a column of the compressed intermediate representation 206 and one or more predicates may be satisfied by returning columns that match the specified column (e.g., segments within server nodes 403A, 403B). In some examples, the match function may specify a variable or value. For instance, the match function may specify log statements generated on a specific day. In some examples, the one or more predicates may be satisfied by returning timestamps of compressed log statements that match the specified day.

In some examples, the search query 406 may include a UDF that indicates an extract function. In some examples, search model 408 may convert the search query 406 into one or more predicates that extracts specific log text into a string. By way of example an encoded variable stored in a column of a segment may include more than one keyword or value. For instance, the timestamp field may include a day and time value. In some examples, the extract UDF may extract the time value from the timestamp field to return query results 405 for a specific time rather than all times time during a day. In some examples, the search model 408 may convert the extracting UDF to one or more predicates that is satisfied when the specified data type is extracted from one or more segments. In some examples, the extract UDF may be utilized with the matching or constructing UDF.

For instance, the search query 406 may include a UDF that indicates a construct function. In some examples, the search model 408 may convert the search query 406 into one or more predicates that constructs a query result 405 which may include disparate fields or values. By way of example, the construct function may be used to specify that values associated with index type 1 should be returned with values associated with index type 2. For instance, values associated with index type 1 and index type 2 may be associated with different types of logs statements. In some examples, the construct UDF may concatenate the values for the different types of log statements to allow the different types of log data to be analyzed and compared together by the analytical applications 111.

In some examples, the search model 408 may generate one or more search queries 406 based on the one or more predicates. For instance, the search query 406 may include one more or more predicates. In some examples, the search query 406 may include on or more sub-queries. For instance, a search query 408 may indicate nested predicates. By way of example, the search query 406 may include a matching function for an index type, and an extraction function of a subset of the specified index types. In some examples, the parent matching function predicate may only be satisfied once the child extraction function has been satisfied. In some examples, the search model 408 may segment the nested predicates into one or more subqueries that satisfy the nested predicates. In other examples, the search model 408 may generate multiple search queries 406 to satisfy the one or more predicates.

Returning to FIG. 4, the analytical applications 111 may allow a user to enter a data query via the user interface of the computing device 407. The data query may be in any data query language. For instance, the data query may be a SQL (standard query language), PQL (pinot query language), or any type of data query language. In some examples, the data query may be indicative of one or more compressed log statements stored in the storage system 104. For instance, the compressed intermediate representation 206 may include a plurality of compressed log statements and may be stored in one or more segments across one or more servers of the distributed data store 108 and the distributed file system 104.

In some examples, the analytical applications 111 may transmit the one or more search queries 406 including the predicates through a proxy 110 to the distributed data store 108 which facilitates searching nodes (e.g., servers, clusters, etc.) to locate segments which satisfy the one or more predicates. For instance, the search queries 406 may be transmitted via an API call. For instance, the API call may be facilitated through a RESTful (representational state transfer) API, graphQL API, SOAP API, etc. The proxy 110 may include a server, cluster of servers, virtual machines, or a computing system which serves as an intermediary between a client (e.g., analytical applications 111) and a server (e.g., distributed data store 108). In some examples, the proxy 110 may be an API proxy. An API proxy may include an API gateway. In some examples, the API proxy may decouple the analytical application 111 from the back-end services (e.g., microservices 102, logging platform 106, distributed data store 108, etc.). In some examples, the proxy 110 may facilitate API calls (e.g., search query 406 for data logs) between the analytical applications 111 and the storage system 104. For instance, the proxy 110 may handle identity management and authentication for search query 406 to ensure the security of the data logs and the identity of the computing device associated with the analytical application 111.

In some examples, the distributed data store 108 may include a plurality of nodes configured to receive the search query 406 (e.g., the one or more predicates) and facilitate searching the storage system 104 for the query result. For example, the distributed data store 108 may include one or more controller nodes 401, broker nodes 402, and sever nodes 403A. In some examples, the distributed data store 108 may include one or more clusters. For instance, a cluster may be a set of nodes (e.g., controller nodes 401, broker nodes 402, server nodes 403A). In some examples, the nodes may include servers and computing resources. In some examples, the controller nodes 401, broker nodes 402, and sever nodes 403A may act as a distributed uniform system.

For instance, the controller nodes 401 may include software running on one or more nodes (e.g., servers) which manage the overall health of the distributed data store 108. For instance, the controller node 401 may control and orchestrate the processing of the one or more broker nodes 402 for facilitating search queries 405 and query results 405. Broker nodes 402 may include software running on one or more nodes (e.g., servers) which receive search queries 406, forward the search query 406 to the correct server (e.g., server nodes 403A, 403B) where the requested data is stored, and consolidate query results 405 from respective servers to transmit the query result to the query system. Sever nodes 403A may include software running on one or more nodes (e.g., servers) which manages files and storage capacity. In some examples, sever nodes 403A may include software which accepts search queries 406 and utilizes an index to search one or more segments stored in tables on the servers of the server nodes 403A. In some examples, the distributed file system 107 may manage servers nodes 403B associated with the distributed data store 108. For instance, the distributed file system 107 may include more storage capacity than the distributed data store 108 and may manage large quantities of segments. In some examples, the distributed file system 107 may receive search queries 406 from the broker nodes 402 and search segments with the server nodes 403B. In some examples, the distributed file system 107 may return a query result 405 to the broker nodes 402 based on searching the server nodes 403B.

In some examples, forwarding the search query to the respective servers nodes may include searching the compressed dictionary within the segments for corresponding dictionary entries. For instance, the "uploading data" index type may be encoded and assigned an id. The id may point to the raw value "uploading data" which has been deduplicated and encoded as a compressed intermediate representation 206 within the segments of the storage system. In some examples, the broker nodes 402 may determine the assigned id and search the server nodes 403A, 403B, for all segments which include the respective id. In some examples, the assigned id may be associated with a compressed log index. The compressed log index may include an index of respective log statements which have been assigned the id. For instance, the compressed log index may indicate that an id has been assigned to 10 log statements. In some examples, searching the segments with the id using the index may indicate the assigned id and each log statement which includes the assigned id to allow more efficient searching. An example of searching the compressed log index using an id is further described with reference to FIG. 6.

In some examples, the controller node 401 may optimize the performance and storage of the distributed data store 108. By way of example, the controller node 401 may determine the broker nodes 402 are reaching computing capacity for facilitating search queries 406 and query results 405. In some examples, the controller nodes 401 may provision an additional cluster of broker nodes 402 to increase computing resources for the distributed data store 108. In another example, the distributed data store 108 may determine that the one or more server nodes 403A is reaching storage capacity and transmit one or more data segments stored in the server nodes 403A to the serve nodes 403B of the distributed file system 107 to increase storage capacity fort the distributed data store 108. An example of nodes managing computing resources to facilitate query results 405 is further described with reference to FIG. 5.

In some examples, one or more predicates within the search query 406 may filter the plurality of compressed log statements. For example, the broker nodes 402 may forward the search queries 406 to the server nodes 403A, 403B and the server nodes 403A, 403B may filter the segments stored on the respective servers to retrieve the query result 405. By way of example, the server nodes 403A, 403B may iterate through respective segments and filter the plurality of compressed log statements which do not satisfy the predicates. In some examples, the server nodes 403A,403B may generate the query result 405 based on the plurality of compressed log statements which satisfy the predicates. In some examples, the server nodes 403A,403B may forward the query result to the broker nodes 402 to be consolidated with other query results 405 to be transmitted through the proxy 110 to the query system 105.

In some examples, the search model 408 may receive a query result 405 from the storage system 104 which satisfies the one or more predicates. In some examples, the search model 408 may reconstruct the query result 405 by decoding the response and providing the decoded data logs to the analytical applications 111. For instance, the query result 405 may include encoded messages 305 that represent the raw values of the compressed log statements. In some examples, the search model 408 may reconstruct the query result 405 without decompressing the logs statements by decoding the compressed intermediate representation 206.

For instance, the query result 405 may include the decoded values of the compressed intermediate representation 206. For instance, the search model 408 may receive the query result 405 and reconstruct the compressed intermediate representation 206 by decoding the query result 405 using a compressed log index. An example of the compressed log index decoding the compressed intermediate representation is further defined with reference to FIG. 6.

In some examples, the search model 408 may be implemented anywhere within the computing system 101 which interfaces with the storage system and the query system 105.

For example, the search model 408 may be implemented within servers of the query system 105 independent from the analytical applications 111. By way of example, the search model 408 may be implemented as an intermediary system triggered by the proxy 110 when receiving a search query 406 or query result 405. In some examples, the search model 408 may be implemented as a proxy feature within the proxy 110. For instance, the proxy 110 may be configured to ignore API requests that have not been processed by the search models 408. By way of example, the search model 408 may include an authorization token which authorizes the search queries 406 and query results 405. In some examples, the search models 408 may be implemented within the storage system 104. By way of example, the search model may be included within the broker nodes 402. For instance, the broker nodes may condition acceptance of search queries 406 which have been processed by the search models 408 and trigger the search model 408 on transmission of the query result 405. In some examples, the search model 408 may be deployed within the storage system 104. For instance, the search model 408 may be deployed on each of the server nodes 403A, 403B. In some examples, the storage system may transmit query results 405 which include decoded data logs.

Figure 5:
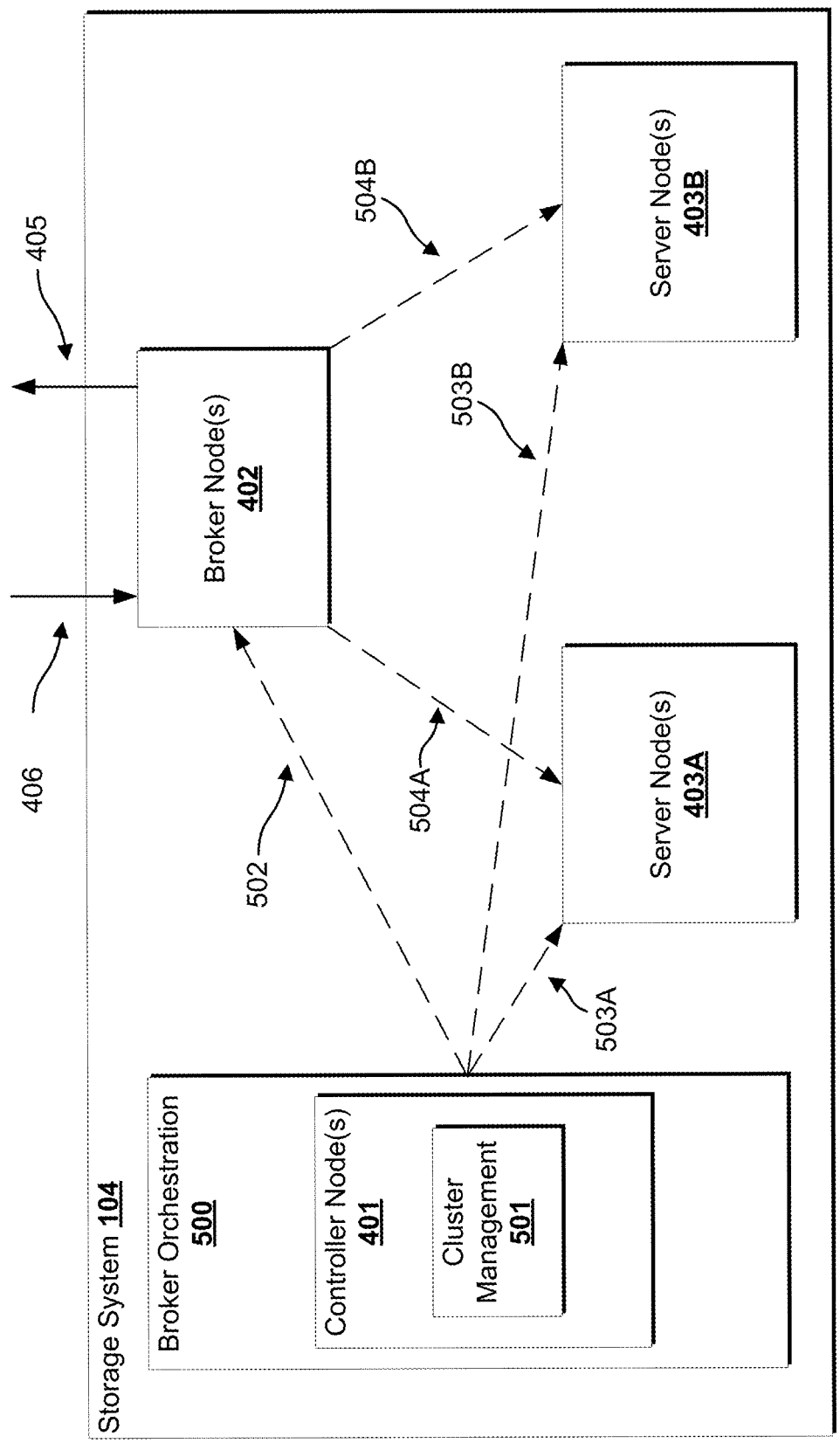
FIG. 5 depicts an example computing system according to example aspects of the present disclosure.

FIG. 5 depicts an example computing system according to example aspects of the present disclosure. The example storage system 104 may include the a broker orchestration service 500 configured to facilitate search queries 406 and search results 405 using the broker node 402 for accepting and forwarding search queries 406 to the server nodes 403A, 403B. In some examples, the server nodes 403A, 403B receive the search queries 406, execute the search functions, and forward the query results 405 to the broker nodes 402.

In some implementations, the broker orchestration service 500 is implemented within the distributed data store 108. For instance, the broker orchestration service 500 may include software running on one or more clusters or servers within the distributed data store 108. In some implementations, the broker orchestration service 500 may be implemented on a cluster of nodes. For instance, the broker orchestration service 500 may include the controller nodes 401 for controlling the broker nodes 402 and the server nodes 403A, 403B.

In some examples, the controller nodes 401 may include a cluster management system 501 configured to manage the computing resources of the storage system 104. The cluster management system 501 may include a container service or software configured to optimize clusters of distributed computing resources. For instance, the storage system 104 may be implemented on a cluster using a container service. In some examples, the broker orchestration service 500 may be implemented on a cluster independent from the broker nodes 402 and the server nodes 403A,403B within the storage system 104. In other examples, the broker orchestration service 500 may be implemented on the same cluster and share computing resources with the broker nodes 402 and server nodes 403A, 403B. The cluster management system 501 may orchestrate the management of computing resources across the storage system 104 to serve query results 405 in a distributed manner.

By way of example, the broker nodes 402 may receive a search query 406 including one or more predicates. The predicates may include a matching function for an index type of "uploading data". In some examples, the broker nodes 402 may determine that a compressed intermediate representation 206 including log statements with an index type of "uploading data" is stored in server nodes 403B within the server nodes 403A, 403B and forward the search queries 504A, 504B to the respective server nodes 403A, 403B. In some examples, the server nodes 403A, 403B may search respective tables within the respective servers and return a query response to the broker nodes 402. In some examples, the broker nodes may collect the query responses from the server nodes 403A, 403B and consolidate the results into a single query result 405. In some examples, broker nodes 402 may transmit the query result 405 through the proxy 110 to the analytical applications 111.

By way of example, the broker nodes 402 may receive one or more search queries 406 from one or more systems (e.g., query system 105). In some examples, the search query 406 may include one or more predicates. In some examples, predicates may be associated with an index type. For instance, the index type may indicate a type of log statement. In some examples, the index type is associated with an index of the storage system. For instance, server nodes 403A, 403B include an index that prevents duplication of columns within the tables of the server nodes 403A, 403B. In some examples, the index type may indicate specific tables where the requested compressed log statements are stored. In some examples, the broker nodes 402 may access the index of respective server nodes 403A, 403B to determine the specific server node 403A, 403B where the requested compressed data logs are stored. In other examples, the broker nodes 403 may store a copy of the index for respective broker nodes server nodes 403A, 403B.

In some examples, server nodes 403A, 403B may be associated with the ingestion system 103 or the storage system 104. For instance, the server nodes 403A, 403B may be associated with the logging platform 106 and the distributed data store 107 respectively. In some examples, the server nodes 403A, 403B may be associated with the distributed data store 108 and the distributed file system 107 respectively. In some examples, the server nodes 403A, 403B may only be associated with the distributed file system 107. There may be any association combination of server nodes 403A, 403B. In some examples, the server nodes 403A, 403B may be accessible to server search queries 406 and query results independent of the associated system.

By way of example, the server nodes 403A may be associated with the logging platform 106 and include segments which have not been transmitted to the distributed file system 107. In some examples, server nodes 403B may be within the distributed file system 107 and may be associated with the distributed data store 107. In some examples, a search query 406 may request data stored across the sever node 403A within the logging platform 106 and sever node 403B within the distributed file system 107. In some examples, the broker nodes 402 may forward a search query 504A to the sever node 403A within the logging platform 106 and forward search query 504B to sever node 403B within the distributed file system 107.

In some examples, the server nodes 403A, 403B may receive the search queries 504A, 504B and search the respective tables to satisfy the predicates. In some examples, sever node 403A, 403B may search the respective tables using a dictionary. For instance, the compressed intermediate representation 206 may include a compressed dictionary. In some examples, the compressed dictionary may include encoded dictionary entries that point to the raw values of the compressed log statements. For instance, the dictionary may include an id assigned to a dictionary entry. In some examples, the dictionary id is assigned each time the dictionary entry appears in a log statement.

In some examples, the server nodes 403A, 403B may identify a dictionary id which satisfies the one or more predicates within the search queries 504A, 504B. For instance, a predicate may be satisfied by returning segments (e.g., compressed log statements) which include a dictionary id of 1. The dictionary id of 1 may indicate a specific field within the compressed log statements. In some examples, satisfying the predicate may include returning all compressed log statements including a dictionary id of 1. In other examples, satisfying the predicate may include returning the specific value with a dictionary id of 1.

In some examples, the server nodes 403A, 403B may analyze a forward index associated with the respective tables. For instance, the server nodes 403A, 403B generate forward index by storing a mapping of ids to words. For instance, the server nodes 403A, 403B may process a search query 504A, 504B and determine a mapping of dictionary ids to the a key word (e.g., variable value). In some examples, the server nodes 403A, 403B store the mappings in a forward dictionary and analyze the forward index to determine the query result. By way of example, a forward index may store a text string "uploading data" and the assigned dictionary id such that a mapping of "uploading data" and the assigned dictionary is stored an index. In some examples, the server nodes 403A, 403B may receive a search query including the text string "uploading data" and return each log statement which includes the text string by searching the columns with the assigned dictionary id. In some examples, the forward index may decode the text string and dictionary id. In other examples, the forward index may return the encoded text string. For instance, the search model 408 may decode the encoded text string.

In some examples, the server nodes 403A, 403B may generate a text index over the dictionary entries. For instance, server nodes 403A, 403B may process a search query 504A, 504B and identify stores information about ids and their location within one or more columns of the respective table. In some examples, the ids may be associated with values which include text (e.g., variable "uploading data".) In some examples, the text index may index the location of the text and allow searching of respective tables across server nodes 403A, 403B using the test index.

Returning to FIG. 5, the broker orchestration service 500 may monitor the computing resources of the server nodes 403A, 403B and broker nodes 402 to ensure efficient performance and management of computing resources. By way of example, the cluster management system 501 may determine the broker nodes 402 are reaching computing capacity for facilitating search queries 406 and query results 405. In some examples, the broker orchestration service 500 may provision an additional cluster 502 of broker nodes 402 to increase computing resources for the broker nodes 402. In another example, the cluster management system 501 may determine that the one or more server nodes 403A is reaching computing capacity and reallocate computing resources from server nodes 403B to server nodes 403A by deprovisioning computing resources from sever nodes 403B and provisioning additional computing resources 503A.

The broker orchestration service 500 may ensure that broker nodes 402 are properly forwarding search queries 406 to the correct server nodes 403A, 403B. By way of example, the broker nodes 402 may forward a search query to server node 403A and server node 403A may determine that predicates are not satisfied. In some examples, the broker orchestration service 500 may trigger the broker nodes 402 to forward the search query 406 again or forward the search query to server nodes 403B. In some examples, the broker orchestration service 500 may determine that search query 504A was not received by server node 403A. For instance, latency issues or network disruptions may prevent delivery of search query 504A. In some examples, the broker orchestration service 500 may trigger the broker node 402 to forward the search query 406 until the server node 403A indicates receipt of the search query 504A.

In some examples, the sever nodes 403A,403B may process the search queries 504A, 504B and forward the query results 405 to the broker nodes 402. the broker nodes 402 may consolidate the query results 405 and transmit the query results to the storage system 104. In some examples, the broker orchestration service 500 may monitor the broker nodes 402 to ensure that that search queries 405 are being served timely. For instance, analytical applications 111 transmitting search queries 406 may require query results within seconds or milliseconds to avoid latency issues delivering data analytics. In some examples, the cluster management system 501 may provision additional computing resources to ensure that query results 405 are served timely.

Figure 6:
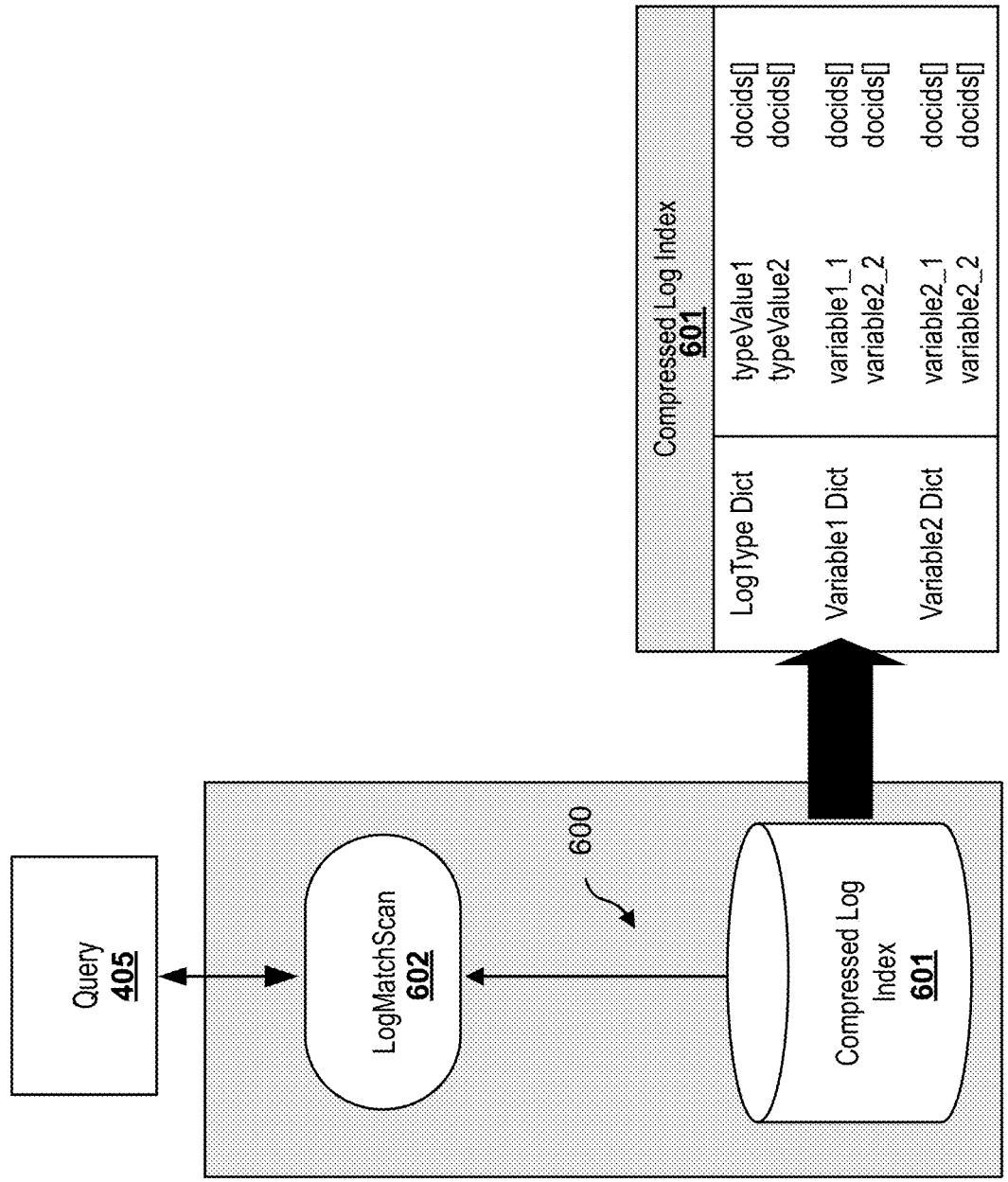
FIG. 6 depicts an example data pipeline according to example aspects of the present disclosure.

FIG. 6 depicts an example data pipeline according to example aspects of the present disclosure. The following description of data flow in data pipeline 600 is described with an example implementation in which a search query 405 is facilitated using a compressed log index 601 and a log matching function 602. In some examples, data pipeline 600 may be implemented within the computing system 101. For instance, the ingestion system 103 may receive a data stream including a plurality of log statements, the log statements may be parsed by a columnar data compression model 203 and compressed by a general data compression model 205. In some examples, a compressed intermediate representation 206 may be ingested by the distributed data store 108 and stored as a compressed log index type. In some examples, the index type indicates the type of log statement. In some examples, the compressed intermediate representation 206 may be associated with a compressed log index type. For instance, the compressed intermediate representation 206 may include a plurality of compressed log statements.

In some examples, the compressed intermediate representation 206 may be stored within one or more server nodes 403A, 403B associated with the distributed data store 108. In some examples, the distributed data store 108 may include native indexing features. For instance, the native indexing features may allow the compressed intermediate representation 206 to be indexed as a compressed log index type in the compressed log index 601. In some examples, the log compressed log index 601 may indicate the location of the plurality of compressed logs statements (e.g., the compressed intermediate representation 206) across the server nodes 403A, 403B.

By way of example, the search model 408 may parse the search query 405. In some examples, the search query 405 may indicate a request for a plurality of log statements. In some examples, the search query 405 may include a request for a plurality of compressed log statements (e.g., compressed intermediate representation 206) and a plurality of log statements which have not been compressed. For instance, the distributed data 107 may store raw data logs including log statements which have not been compressed. In some examples, the broker nodes 402 may identify the correct sever nodes 403A, 403B storing the compressed log statements based on a compressed log index type. The server nodes 403A, 403B may include the compressed log index 601. For instance, the compressed log index may allow the server nodes 403A,403B to avoid determining whether each entry within the respective tables satisfies the one or more predicates within the search query 405. For instance, search queries 405 which include a request for compressed data may include a predicate that is satisfied when a compressed log type is returned.

In some examples, the compressed log index 601 may store the log type dictionary, dictionary variables, and non-dictionary variables included in the compressed intermediate representation 206. For instance, the compressed log index 601 may index the dictionary of log templates (e.g., repetitive grouping of fields within a log statement) which was utilized to perform deduplication upon ingestion. In some examples, the compressed log index 601 may index dictionary variables. For instance, the dictionary variable may include repetitive variables across the plurality of log statements. In some examples, the compressed log index 601 may index non-dictionary variables. For instance, non-dictionary variables may include non-repetitive variables across the plurality of logs statements. In some examples, the compressed log index 601 may index the mapping of the dictionary ids assigned to the compressed log templates, dictionary variables, and non-dictionary variables.

In some examples, the log match scan function 602 may include software configure to filter compressed log statements based on the compressed log statement matching a column defined within a UDF and satisfying a predicate. In some examples, the log match scan function 602 may be computer logic within computer software. In some examples, the log match scan function 602 may be implemented within a server of the distributed data store 108. For instance, the log match scan function 602 may be implemented on the server nodes 403A, 403B. In some examples, the log match scan function 602 may be implemented on the broker nodes 402. In some examples, the log match scan function 602 may be implemented on any server, cluster, container or computing resource which may receive a search query 405 and execute a computing function. In some examples, the log match scan function may be a function of the search model 408. For instance, the search model 408 may be deployed within the storage system 104. In some examples, the log match scan function 602 may be a function of the search model deployed on the server nodes 403A, 403B.

By way of example, the log match scan function 602 may receive a search query 405 including one or more columns and one or more predicates. In some examples, the log match scan function 602 may search the compressed log index 601 for columns which match the column defined in the search query 405. For instance, the compressed log index 601 may indicate the location of each compressed log statement (e.g., compressed intermediate representation 206) across the server nodes 403A, 403B. In some examples, the compressed log index 601 may include the dictionary ids assigned to the log type dictionary. For instance, the log type dictionary may store log templates and assign a log type dictionary id. In some examples, the log match function 602 may determine the log type dictionary id includes the column indicated in the search query 405. For instance, the log match scan function 602 may iteratively search the server nodes 403A, 403B using the log type dictionary ids to determine whether the column specified in the search query 405 is included in any of the log templates. In some examples, the log match scan function 602 may return all of the log templates which include a column that matches the specified column and iteratively scan (e.g., search each value of the specified column and return the values which satisfy the predicates.

In some examples, the column defined in the search query 405 may be stored as a dictionary variable or a non-dictionary variable. For instance, the log match scan function 602 may determine the column specified in the search query 405 matches the column name (e.g., variable value) the compressed log index 601 and identify the dictionary id assigned to the column. In some examples, the log match scan 602 may search the plurality of compressed log statements for the assigned dictionary id and return the plurality of log statements which have the matching column name that was specified in the search query. In some examples, the log match scan function 602 may iteratively scan (e.g., search) each value in the matching column and return the values which satisfy the defined predicates.

In some examples, the log match scan function 602 may iteratively search the server nodes 403A, 403B until each column and predicate has been matched and satisfied. In some examples, the log match scan function 602 may output the query result 405. By way of example, the log match scan function 602 may be implemented on one or more server nodes 403A, 403B. In some examples, the server nodes 403A, 403B may execute search queries 406 by executing the log match scan function 602. In some examples, the sever nodes 403A, 403B may execute the log match scan function 602 generate a query result 405 and the sever nodes 403A, 403B may transmit the query result 405 to the broker nodes 402 to be consolidated with other query results.

Figure 7:
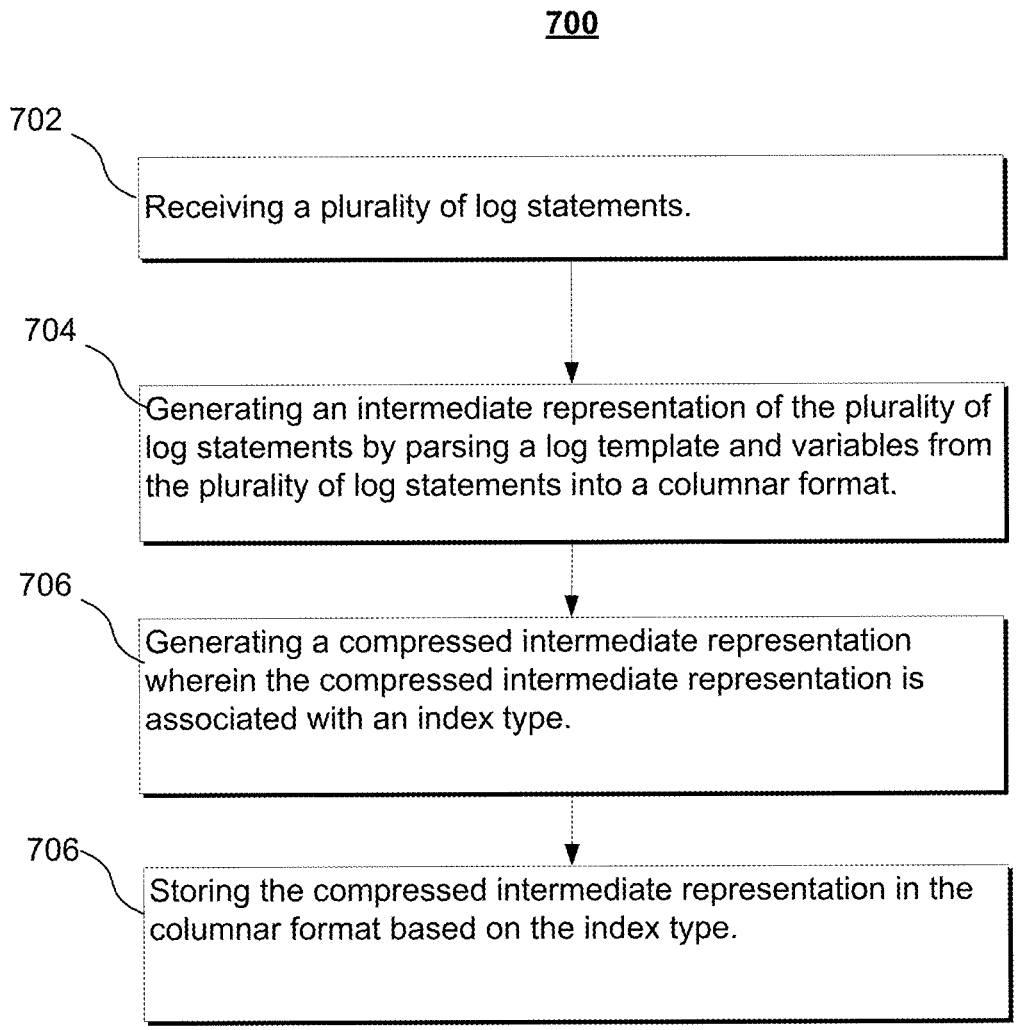
FIG. 7 depict a flowchart diagram of an example method according to example aspects of the present disclosure.

FIG. 7 depicts a flowchart diagram of an example method according to example aspects of the present disclosure. One or more portion(s) of the method 700 may be implemented by one or more computing devices such as, for example, the computing devices/systems described in FIGS. 1, 2, 4, etc. Moreover, one or more portion(s) of the method 700 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 700. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 700 may include a step 702 or otherwise begin by receiving a plurality of log statements. For instance, microservices 102 may generate data logs. Microservices 102 may include an application which is architected into independent services that communicate over APIs (application programming interfaces). Microservices 102 may be deployed in a container (e.g., standalone software package for a software application) using a container service, or on VMs (virtual machines) within a shared network. A container service may be a cloud service that allows developers to upload, organize, run, scale, manage, and stop containers using container-based virtualization to orchestrate their respective actions. A VM may include virtual computing resources which are not limited to a physical computing device.

In some examples, microservices 102 may generate high variance (e.g., diverse) log data. By way of example, the microservices 102 may generate structured, unstructured, and semi-structured data logs. For instance, microservices 102 may generate data logs which include a plurality of log statements. The plurality of log statements may include recorded data generated by interactions with the microservices 102. For instance, a log statement may include a plurality of fields and variables which capture metadata associated with an event or interaction with a microservice. By way of example, a user may interact with a microservice 102 to request services, update a request for services, or cancel a request for services. In some examples, the microservices 102 may generate log statements for each interaction. In some examples, the microservices may transmit a data stream (e.g., stream of data logs) including a plurality of log statements to a computing system 101 where the log statements may be stored and accessed.

In an embodiment, the method 700 may include a step 704 or otherwise begin by generating an intermediate representation of the plurality of log statements by parsing a log template and variables from the plurality of log statements into a columnar format. For instance, the computing system 101 may generate the data streaming pipelines to receive the plurality of log statements from the microservices 102 and trigger a plurality of data compression models to compress the data logs within the data stream 202 as they are being written to one or more topics. For instance, the logging platform 106 may utilize one or more trained machine-learned models such as a columnar data compression model 203 and a general data compression model 205.

In an embodiment, the columnar data compression model 203 may be an unsupervised trained model configured to receive a plurality of data logs from the data stream 202, analyze the data logs and identify a log template and variables within the data logs. In some implementations, the columnar data compression model 203 may parse the log template and variables from the data logs into a columnar format. In some examples, the columnar data compression model 203 may include one or more trained machine-learned models. For instance, the columnar data compression model 203 may include a trained machine-learned model configured to analyze data logs and generate an intermediate representation of structured and unstructured logs. In some examples, the columnar data compression model 203 may include a trained machine-learned model 203 configured to analyze data logs and generate an intermediate representation of semi-structured data logs. In other examples, the columnar data compression model 203 may be trained to analyze data logs and generate an intermediate representation of any type of data log.

The columnar data compression model 203 may be or otherwise include various trained machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. In some examples, the columnar data compression model 203 may be any model that maps input data to bit sequences that produces a shorter output than the input data and structures the data in a columnar-oriented manner.

The columnar data compression model 203 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using pre-determined bit sequences. As further described herein, the training data may include pre-determined bit sequences which represent raw data. In some examples the pre-determined bit sequences reduce the amount of storage required to store the raw data. In some examples, the training data may include simulated training data (e.g., training data obtained from simulated scenarios, inputs, configurations, large data sets, etc.).

The columnar data compression model 203 may analyze the log statements within the data stream 202 and identify repetitive properties across the data logs. Repetitive properties may include repetitive fields or repetitive values across a plurality of log statements.

In some examples, log statements may indicate a log type. For instance, log types may be a field included in the log statement that indicates the type of data log. By way of example, microservices 102 may generate multiple types of data logs. The type of data log may indicate that the log was generated by a specific microservice 102 or indicate that a similar interaction occurred. In some examples, log statements of the same log type may include the same fields and capture the same metadata. In some examples, the log data may include a plurality of log statements of the same log type. In some examples, the log data may include a plurality of log statements of varying log types. In some examples, data logs which include logs statements of the same type may include repetitive fields and repetitive metadata. In other examples, data logs which include log statements of varying log types may also include repetitive field and repetitive metadata.

In some examples, the fields within a log statement may include variables (e.g., data which populates the field. Example variables may include integers, text strings, floating-point numbers, encoded values, etc. In some examples, the variables across a plurality of log statements may be the same. For instance, a log statement may include a log type field that indicates the log is a has been generated as a result of "uploading data". In some examples, the log statement would include the log type field and the "uploading data" variable. In some examples, multiple microservices 102 may perform the task of "uploading data" and generate a log statement including a log type field with a variable of "uploading data". In some examples, microservices 102 may generate several log statements which include repetitive fields. In some examples, microservices 102 may generate several log statement which include repetitive fields and variables.

In some examples, the index type may be associated with data type. For example, the variables may be indexed. In some examples, the log statements may be indexed based on the data type (e.g., the type of variable value). For example, log statements may include a timestamp field and include integer values which represent the day and time. In some examples, the log statements may be indexed based on integer data types such that the timestamp field may be searched more efficiently. For example, a data type may indicate a the type of data stored within a column.

In some examples, the columnar data compression model 203 may utilize the repetitive qualities of the log statements to perform data compression. For instance, the columnar data compression model 203 may iterate through the log statements to determine one or more repetitive properties (e.g., fields and variables) of the plurality of log statements within the log data and generate a log template. A log template may include one or more repetitive fields across the plurality of log statements. In some examples, the columnar data compression model 203 may extract (e.g., parse) the log templates from the plurality of log statements and store the repetitive values in a dictionary. A dictionary may store log templates (e.g., repetitive grouping of fields within a log statement) to perform deduplication. For instance, the columnar data compression model 203 may iterate through the plurality of log statements, identify a log template and store the log template in the dictionary. As the columnar data compression model 203 iterates through log statements, the same log template may be identified. In some examples, the columnar data compression model 203 may determine the same log template identified across recently processed log statements has already been added to the dictionary and may avoid generating a duplicate log template entry in the dictionary.

In some examples, the columnar data compression model 203 may determine non-repetitive properties across the plurality of log statements. For instance, the non-repetitive properties may include variables or fields which are unlikely to be repeated in a consistent manner across the plurality of log statements. By way of example, the log statements may include a similar field that indicates the time taken for a task to be completed (e.g., "operation took" field). In some examples, the field which stores the variable time taken to execute the task may vary across the plurality of logs. For instance, latency changes, network disruptions, or application errors may affect the time taken to execute the same task. In some examples, the columnar data compression model 203 may store the non-repetitive values in the dictionary as non-dictionary values.

In some examples, the non-dictionary variables may be used to generate consistent bit sequences for variables which equal the non-dictionary variable. For instance, a task which takes 0.335 seconds may not be consistent across a plurality of log statements and may be stored as a non-dictionary variable. In some examples, the columnar data compression model 203 may encode (e.g., generate a bit sequence) 0.335 seconds. In some examples, the encoding may reduce the amount of storage needed to store the variable 0.335 seconds. For instance, the columnar data compression model 203 may represent 0.335 seconds as 01. In some examples, the columnar data compression model 203 may iterate through log statements and identify the variable 0.335 seconds and consistently encode (e.g., encoding scheme) the variable to 01.

In some examples, the columnar data compression model 203 may determine the log template and parse the log template from the plurality of log statements. By way of example, the columnar data compression model 203 may parse the plurality of log statements into a timestamp, a list of variable values, and the log type. In some examples, each of the plurality of log statements within the log data may include a time stamp, variables, and a log type. In some examples, the columnar data compression model 203 may parse the plurality of log statements into a columnar format.

In an embodiment, the method 700 may include a step 706 or otherwise begin generating a compressed intermediate representation wherein the compressed intermediate representation is associated with an index type. For instance, the computing system 101 may include a general data compression model 205 configured to receive output from the columnar data compression model 203 and perform lossless data compression. Lossless data compression may include any technique for compressing data while allowing for reconstruction of the compressed data with no loss of information. For instance, the columnar data compression model 203 may output an intermediate representation 204 of a plurality of log statements. In some examples, the intermediate representation 204 may include an encoded message (e.g., encoded message 305). In other examples, the intermediate representation 204 may include a plurality of encoded messages 305. For instance, the intermediate representation 204 may include one or more compressed log statements in the column-oriented structure.

The general data compression model 205 may be or otherwise include various trained machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. In some examples, the general data compression model 205 may be any model that maps input data to bit sequences that produces a shorter output than the input data and compresses a columnar structure.

The general data compression model 205 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using pre-determined bit sequences. As further described herein, the training data may include pre-determined bit sequences which represent encoded data. In some examples the pre-determined bit sequences reduce the amount of storage required to store the encoded data. In some examples, the training data may include simulated training data (e.g., training data obtained from simulated scenarios, inputs, configurations, large data sets, etc.).

In some examples, the general data compression model 205 may perform lossless data compression by further encoding the intermediate representation (e.g., encoded message 305). For instance, general data compression model 205 may include an encoding method which generates a bit sequence to represent the encoded values of the intermediate representation 204. In some examples, the columnar-oriented structure of the intermediate representation allows for increased compression. For instance, the intermediate representation 204 may compress and organize the plurality of log statements such that similar data is encoded together. For example, generating bit sequences for dissimilar data may introduce complexity and result in lower compression ratios.

By way of example, the general data compression model 205 may encode the encoded messages 305 included in the intermediate representation 204. The general data compression model 205 may generate a bit sequence which is use fewer characters than the encoded value within each column of the compressed intermediate representation 204. For instance, the compressed intermediate representation 204 may include a variable value of "0x00053DA". The general data compression model 205 may generate a bit sequence of "53D" to represent the variable value.

In some examples, the general data compression model 205 may encode the variables in a column of the compressed intermediate representation 204 using a similar encoding pattern (e.g., encoding scheme) due to the similar characteristics of the values. For instance, the general data compression model 205 may include an encoding scheme that encodes the "0x00018LK" as "18L" due to the similar characteristics of the encoded values such as character length. In some examples, the intermediate representation 204 includes encoded values which include align to a consistent encoding scheme that results in consistent bit sequences for similar types of data. In some examples, the consistent encoding scheme is a result of the columnar data compression model 203. In some examples, the consistency of similarly encoded data allows for greater data compression by the general data compress model 205.

In some examples, the encoding scheme may be used to decode the data. For instance, the same pattern utilized to generate the bit sequence may be used to decode (e.g., convert the bit sequence to the variable value) the intermediate representation 204. In some examples, the encoding scheme may be used to query the compressed data logs. For instance, an analytical application 111 may receive or generate a query for the compressed data logs. The encoding scheme and dictionary may be used to retrieve the queried values without decompressing the data.

In some examples, the general data compression model 205 may further compress the intermediate representation 204. By way of example, the general data compression model 205 may receive the intermediate representation 204 and iterate through the values of each column and encode the values such that the further encoded values include less characters than the encoded values of the intermediate representation 204. In some examples, the general data compression model 205 may compress the intermediate representation 204 within the columnar structure. For instance, the general data compression model 205 may utilize and encoding scheme that encodes similar data more efficiently than dissimilar data. In some examples, the intermediate representation 204 may store similar data within the same column. In some examples, the general data compression model 205 may increase the compression ratio between the encoded message 305 of the intermediate representation 204 and the further encoded compressed columns.

In some examples the genera data compression model 205 may compress the dictionary with the intermediate representation 204. For instance, the intermediate representation 204 may include a dictionary which store dictionary variables 301C and non-dictionary variables 301B. In some examples, the dictionary including the dictionary variables 301C and non-dictionary variables 301B may be encoded and compressed to allow for easier retrieval and querying of the compressed columns (e.g., compressed data logs).

The general data compression model 205 may compress the intermediate representation 204 and output a compressed intermediate representation 206. In some examples, the compressed intermediate representation 206 may include an encoded representation of the intermediate representation 204 which requires less storage. For instance, the compressed intermediate representation 206 may include further compressed variable values in a columnar-oriented manner. In some examples, the general data compression model 205 may output the compressed intermediate representation 206 and write the compressed intermediate representation 206 to a topic within the logging platform 106.

In an embodiment, the method 700 may include a step 706 or otherwise begin by storing the compressed intermediate representation in the columnar format based on the index type. For instance, the computing system 101 may include a storage system 104. The storage system 104 may include one or more systems and may be implemented using a virtual private cloud (VPC), container service, or may be deployed within a public cloud environment. For example, the storage system 104 may include a metadata service 109, a distributed data store 108, and a distributed file system 107. The metadata service 109 may be a service in the form of software code that is used to define the names, data types, etc., for the columns of the distributed data store 108. In some examples, the metadata service 109 is deployed in a container. In other examples, the metadata service may be deployed on a virtual machine.

The metadata service 109 may implement a universal schema for the storage system 104. For instance, the microservices 102 may generate high variance (e.g., diverse) log data. By way of example, the microservices 102 may generate structured, unstructured, and semi-structured data logs. In some examples, high variance data logs may be difficult to store in a single data store due to the difference in structure or format. In some examples, the metadata service 109 may implement a universal schema such that the high variance data logs may be uniformly stored within the storage system 104. For example, the ingestion system 103 may convert the data logs generated by the microservices 102 into a consistent format (e.g., columnar format) prior to storage in the storage system 104. In some examples, the universal schema may align to the consistent format generated by the ingestion system 103. For instance, the universal schema may create native columns within the storage system that match the columns of the consistent format generated by the ingestion system 103. In some examples, the native columns may allow for more efficient storage and querying of the data logs.

In some examples, the storage system 104 may include the distributed data store 108. The distributed data store 108 may be an online analytical processing data store (e.g., OLAP database). An online analytical processing data store may ingest data logs from data streams (e.g., the logging platform 106) or from batch data sources (e.g., the distributed file system 107) and allow analytical applications 111 to deliver data analytics by querying the data through a proxy 110. In some examples, the distributed data store 108 may be implemented using a container service. For instance, the distributed data store 108 may be deployed across multiple clusters of servers or containers.

The storage system 104 may include the distributed file system 107. A distributed file system 107 may be any computer network where data is stored on more than one node (e.g., virtual machine, cluster of virtual machines, servers, etc.). For instance, the distributed file system 107 may include various types of nodes for storing data and segments with differing requirements. In some examples, the distributed file system 107 may include software that manages files in a storage system. Example distributed file systems 107 may include software that manages files stored in a data lake, data warehouse, etc.

By way of example, the logging platform 106 may receive a data stream (e.g., data logs), from a microservice 102, determine the topic for the data logs is associated with real-time data and partition the topic into real-time segments. In some examples, the logging platform 106 may determine the topic is associated with real-time data based on previous or current queries of the same log type (e.g., key value) received by the distributed data store 108 from analytical applications 111. In other examples, the logging platform 106 may be configured to determine real-time data and partition real-time segments. The logging platform 106 may periodically store the real-time segments including data logs in the real-time servers within distributed file system 107. For instance, the distributed file system 107 may include and manage servers associated with the distributed data store 108.

In some examples, when the logging platform 106 stores real-time segments within the distributed file system 107, the logging platform may transmit a notification to the distributed data store 108 indicating that respective real-time segments have been stored within the real-time servers of the distributed file system 107. In some examples, when the distributed data store 108 receives a query for real-time data stored in the distributed files system 107, the distributed file system 107 may facilitate the query results.

Figure 8:
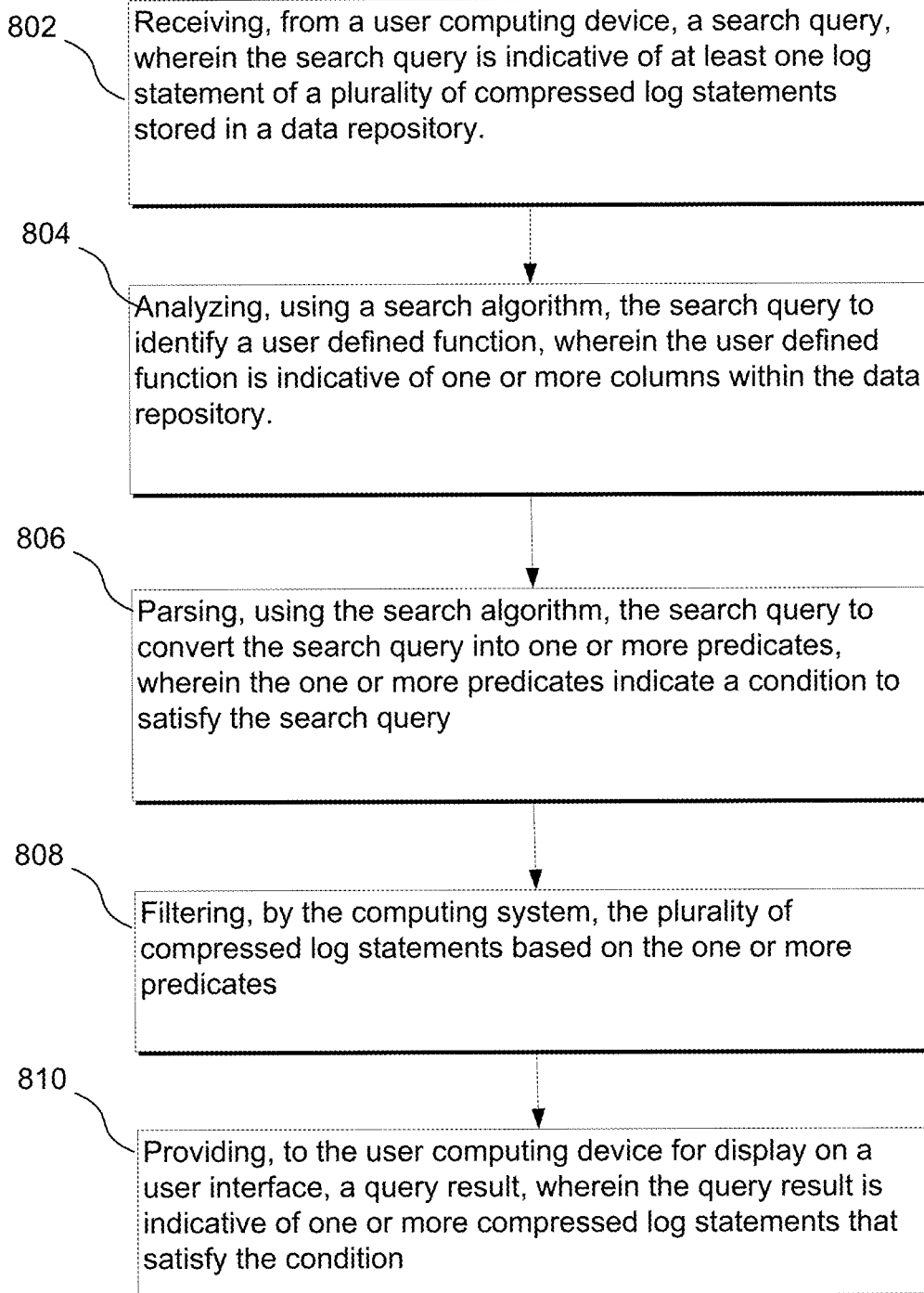
FIG. 8 depicts a flowchart diagram of an example method according to example aspects of the present disclosure.

FIG. 8 depicts a flowchart diagram of an example method according to example aspects of the present disclosure. One or more portion(s) of the method 800 may be implemented by one or more computing devices such as for example, the computing devices/systems described in FIGS. 1, 2, 4, etc. Moreover, one or more portion(s) of the method 800 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 800. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 800 may include a step 802 or otherwise begin by receiving, from a user computing device, a search query, wherein the search query is indicative of at least one log statement of a plurality of compressed log statements stored in a data repository. For example, the computing devices 407 may be associated with one or more users. For instance, a user may interact with the analytical applications 111 displayed on the user interface of the computing device 407. In some examples, the user may submit a search query 406 for compressed data logs stored in the storage system 104. In some examples, the analytical applications 111 may generate a search query 406 based on the query. In other examples, the analytical applications 111 automatically generate a search query 406. For instance, upon accessing (e.g., page load) the analytical applications 111, the analytical applications 111 may generate a search query 406 to retrieve data needed to populate one or more user interface elements (e.g., analytical graphs, charts, dashboards, etc.) of the analytical applications 111. In some examples, the analytical applications 111 may receive the query result 405 including compressed data logs and perform data analytics over compressed data logs.

In an embodiment, the method 800 may include a step 804 or otherwise continue by analyzing, using a search algorithm, the search query to identify a user defined function, wherein the user defined function is indicative of one or more columns within the data repository. For instance, the analytical applications 111 may include one or more search models 408. The search model 408 may be or may otherwise include various machine-learned models. In an embodiment, the search model 408 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks.

In some examples, the search model 408 may be configured to receive a search query 406, identify one or more user defined functions, and convert the search query into one or more predicates that satisfy the search query. For example, the search model 408 may be configured to analyze the search query 406 to identify the log template and variables. For instance, the log template may align to native columns included in tables of the storage system 104. By way of example, the compressed intermediate representation 206 may be stored in a columnar-oriented manner based on a log template and variables parsed from the plurality of log statements. In some examples, the search query 406 may include search parameters associated with the log template and variables. In some examples, the search model 408 may determine the search parameters are associated with the log template and variables and parse the log template and variable from the search query 406.

In some examples, the search parameters may be associated with one or more user defined functions (UDF). A user defined function may accept columns of input, perform actions on the input, and return the result of those actions as a value. By way of example, the search model 408 may be configured to analyze the search query 406 and identify one or more UDFs by determining the search query 406 defines one or more columns (e.g., log template) and values (e.g., variables). In some examples, the log template and variables are indicative of at least one log statement within a segment on a server node stored in the distributed data store 108 (e.g., server node 403A) or the distributed file system 107 (e.g., server node 403B). In some examples, the UDFs may include actions such as matching, extracting, or constructing values of log statements included in the compressed log template of the segments (e.g., compressed intermediate representations 206).

In an embodiment, the method 800 may include a step 806 or otherwise continue by parsing, using the search algorithm, the search query to convert the search query into one or more predicates, wherein the one or more predicates indicate a condition to satisfy the search query. For instance, the search model 408 may convert the UDFs into one or more predicates that satisfy the actions defined in the UDFs. A predicate is an expression that evaluates to true, false, or unknown. For instance, a predicate may utilize boolean logic to formulate statements which evaluate to true, false, or unknown. For example, the search model 408 may determine the search query 406 includes a UDF that indicates a matching, extracting, or reconstructing action for a specified index type column of a segment, and generate a predicate that evaluates each row (e.g., by performing the specified action) of the specified index type column within the segments of the same index type.

In some examples, the search query 406 may include a UDF that indicates a match function. In some examples, the search model 408 may convert the search query into one or more predicates that matches the specified column or variable. By way of example, the compressed intermediate representation 206 may be stored in segments across one or more server nodes. The segments may include columns defined by the columnar data compression model 203 based on parsed log template and variables. In some examples, the match function may indicate a column of the compressed intermediate representation 206 and one or more predicates may be satisfied by returning columns that match the specified column (e.g., segments within server nodes 403A, 403B). In some examples, the match function may specify a variable or value. For instance, the match function may specify log statements generated on a specific day. In some examples, the one or more predicates may be satisfied by returning timestamps of compressed log statements that match the specified day.

In some examples, the search query 406 may include a UDF that indicates an extract function. In some examples, search model 408 may convert the search query 406 into one or more predicates that extracts specific log text into a string. By way of example an encoded variable stored in a column of a segment may include more than one keyword or value. For instance, the timestamp field may include a day and time value. In some examples, the extract UDF may extract the time value from the timestamp field to return query results 405 for a specific time rather than all times time during a day. In some examples, the search model 408 may convert the extracting UDF to one or more predicates that is satisfied when the specified data type is extracted from one or more segments. In some examples, the extract UDF may be utilized with the matching or constructing UDF.

For instance, the search query 406 may include a UDF that indicates a construct function. In some examples, the search model 408 may convert the search query 406 into one or more predicates that constructs a query result 405 which may include disparate fields or values. By way of example, the construct function may be used to specify that values associated with index type 1 should be returned with values associated with index type 2. For instance, values associated with index type 1 and index type 2 may be associated with different types of logs statements. In some examples, the construct UDF may concatenate the values for the different types of log statements to allow the different types of log data to be analyzed and compared together by the analytical applications 111.

In some examples, the search model 408 may generate one or more search queries 406 based on the one or more predicates. For instance, the search query 406 may include one more or more predicates. In some examples, the search query 406 may include on or more sub-queries. For instance, a search query 408 may indicate nested predicates. By way of example, the search query 406 may include a matching function for an index type, and an extraction function of a subset of the specified index types. In some examples, the parent matching function predicate may only be satisfied once the child extraction function has been satisfied. In some examples, the search model 408 may segment the nested predicates into one or more subqueries that satisfy the nested predicates. In other examples, the search model 408 may generate multiple search queries 406 to satisfy the one or more predicates.

In an embodiment, the method 800 may include a step 808 or otherwise continue by filtering, by the computing system, the plurality of compressed log statements based on the one or more predicates. For instance, the one or more predicates within the search query 406 may filter the plurality of compressed log statements. For example, the broker nodes 402 may forward the search queries 406 to the server nodes 403A, 403B and the server nodes 403A, 403B may filter the segments stored on the respective servers to retrieve the query result 405. By way of example, the server nodes 403A, 403B may iterate through respective segments and filter the plurality of compressed log statements which do not satisfy the predicates. In some examples, the server nodes 403A,403B may generate the query result 405 based on the plurality of compressed log statements which satisfy the predicates. In some examples, the server nodes 403A, 403B may forward the query result to the broker nodes 402 to be consolidated with other query results 405 to be transmitted through the proxy 110 to the query system 105.

In some examples, the search model 408 may receive a query result 405 from the storage system 104 which satisfies the one or more predicates. In some examples, the search model 408 may reconstruct the query result 405 by decoding the response and providing the decoded data logs to the analytical applications 111. For instance, the query result 405 may include encoded messages 305 that represent the raw values of the compressed log statements. In some examples, the search model 408 may reconstruct the query result 405 without decompressing the logs statements by decoding the compressed intermediate representation 206.

For instance, the query result 405 may include the decoded values of the compressed intermediate representation 206. For instance, the search model 408 may receive the query result 405 and reconstruct the compressed intermediate representation 206 by decoding the query result 405 using a compressed log index.

In some examples, the log match scan function 602 may include software configure to filter compressed log statements based on the compressed log statement matching a column defined within a UDF and satisfying a predicate. In some examples, the log match scan function 602 may be computer logic within computer software. In some examples, the log match scan function 602 may be implemented within a server of the distributed data store 108. For instance, the log match scan function 602 may be implemented on the server nodes 403A, 403B. In some examples, the log match scan function 602 may be implemented on the broker nodes 402. In some examples, the log match scan function 602 may be implemented on any sever, cluster, container or computing resource which may receive a search query 405 and execute a computing function. In some examples, the log match scan function may be a function of the search model 408. For instance, the search model 408 may be deployed within the storage system 104. In some examples, the log match scan function 602 may be a function of the search model deployed on the server nodes 403A, 403B.

By way of example, the log match scan function 602 may receive a search query 405 including one or more columns and one or more predicates. In some examples, the log match scan function 602 may search the compressed log index 601 for columns which match the column defined in the search query 405. For instance, the compressed log index 601 may indicate the location of each compressed log statement (e.g., compressed intermediate representation 206) across the server nodes 403A, 403B. In some examples, the compressed log index 601 may include the dictionary ids assigned to the log type dictionary. For instance, the log type dictionary may store log templates and assign a log type dictionary id. In some examples, the log match function 602 may determine the log type dictionary id includes the column indicated in the search query 405. For instance, the log match scan function 602 may iteratively search the server nodes 403A, 403B using the log type dictionary ids to determine whether the column specified in the search query 405 is included in any of the log templates. In some examples, the log match scan function 602 may return all of the log templates which include a column that matches the specified column and iteratively scan (e.g., search each value of the specified column and return the values which satisfy the predicates.

In some examples, the column defined in the search query 405 may be stored as a dictionary variable or a non-dictionary variable. For instance, the log match scan function 602 may determine the column specified in the search query 405 matches the column name (e.g., variable value) the compressed log index 601 and identify the dictionary id assigned to the column. In some examples, the log match scan 602 may search the plurality of compressed log statements for the assigned dictionary id and return the plurality of log statements which have the matching column name that was specified in the search query. In some examples, the log match scan function 602 may iteratively scan (e.g., search) each value in the matching column and return the values which satisfy the defined predicates.

In some examples, the log match scan function 602 may iteratively search the server nodes 403A, 403B until each column and predicate has been matched and satisfied. In some examples, the log match scan function 602 may output the query result 405. By way of example, the log match scan function 602 may be implemented on one or more server nodes 403A, 403B. In some examples, the server nodes 403A, 403B may execute search queries 406 by executing the log match scan function 602. In some examples, the sever nodes 403A, 403B may execute the log match scan function 602 generate a query result 405 and the sever nodes 403A, 403B may transmit the query result 405 to the broker nodes 402 to be consolidated with other query results.

In an embodiment, the method 800 may include a step 810 or otherwise continue by providing, to the user computing device for display on a user interface, a query result, wherein the query result is indicative of one or more compressed log statements that satisfy the condition. For instance, the computing device 407 may communicate with the query system 105 over one or more networks. By way of example, the analytical applications 111 may be stored on one or more server of the query system 105. In some examples, the computing devices 407 may communicate with the analytical applications 111 by communicating over one or more networks. In some examples, the computing devices 407 may display the analytical applications 111 on the user interface of the computing devices 407 by communicating over the one or more networks. For instance, the computing devices 407 may access and display the analytical applications 111 over a network such as the internet.

In some examples, the computing devices 407 may be associated with one or more users. For instance, a user may interact with the analytical applications 111 displayed on the user interface of the computing device 407. In some examples, the user may submit a search query 406 for compressed data logs stored in the storage system 104. In some examples, the analytical applications 111 may generate a search query 406 based on the query. In other examples, the analytical applications 111 automatically generate a search query 406. For instance, upon accessing (e.g., page load) the analytical applications 111, the analytical applications 111 may generate a search query 406 to retrieve data needed to populate one or more user interface elements (e.g., analytical graphs, charts, dashboards, etc.) of the analytical applications 111. In some examples, the analytical applications 111 may receive the query result 405 including compressed data logs and perform data analytics over compressed data logs.

In some examples, the analytical applications 111 may be displayed on the user interface of the computing device 407. For instance, the analytical applications 111 may receive the query result 405, generate the user interface elements (e.g., analytical graphs, charts, dashboards, etc.) of the analytical applications 111, and display the user interface elements on the computing device 407. In other examples, the analytical applications 111 may receive the query result 405 and update the user interface elements. In some examples, the user interface elements displayed on the user interface of the user device 407 may include the query result.

Figure 9:
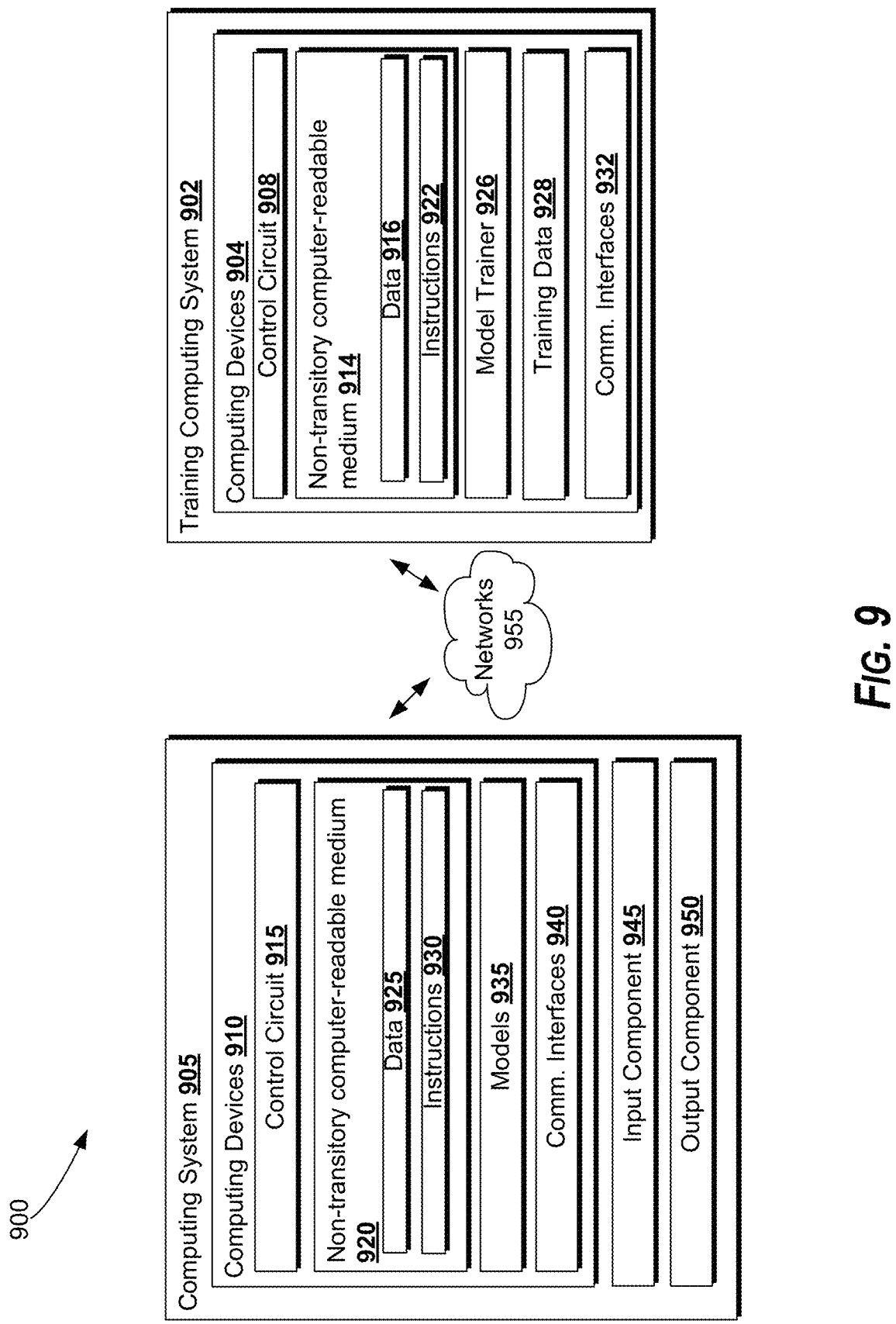
FIG. 9 depicts a block diagram of an example system for implementing systems and methods according to example aspects of the present disclosure.

FIG. 9 depicts a block diagram of an example system 900 for implementing systems and methods according to example embodiments of the present disclosure. The system 900 includes a computing system 905 (e.g., a computing system 101), and a training computing system 902 communicatively coupled over one or more networks 955.

The computing system 905 may include one or more computing devices 910 or circuitry. For instance, the computing system 905 may include a control circuit 915 and a non-transitory computer-readable medium 920, also referred to herein as memory. In an embodiment, the control circuit 915 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 915 may be programmed by one or more computer-readable or computer-executable instructions stored on the non-transitory computer-readable medium 920.

In an embodiment, the non-transitory computer-readable medium 920 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 920 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 920 may store information that may be accessed by the control circuit 915. For instance, the non-transitory computer-readable medium 920 (e.g., memory devices) may store data 925 that may be obtained, received, accessed, written, manipulated, created, and/or stored. The data 925 may include, for instance, any of the data (e.g., log data) or information described herein. In some implementations, the computing system 905 may obtain data from one or more memories that are remote from the computing system 905.

The non-transitory computer-readable medium 920 may also store computer-readable instructions 930 that may be executed by the control circuit 915. The instructions 930 may be software written in any suitable programming language or may be implemented in hardware.

The instructions 930 may be executed in logically and/or virtually separate threads on the control circuit 915. For example, the non-transitory computer-readable medium 920 may store instructions 930 that when executed by the control circuit 915 cause the control circuit 915 to perform any of the operations, methods and/or processes described herein. In some cases, the non-transitory computer-readable medium 920 may store computer-executable instructions or computer-readable instructions, such as instructions to perform at least a portion of the methods of FIGS. 7-8.

In an embodiment, the computing system 905 may store or include one or more machine-learned models 935. For example, the machine-learned models 935 may be or may otherwise include various machine-learned models. In an embodiment, the machine-learned models 935 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. In an embodiment, the computing system 905 may implement multiple parallel instances of a single model.

The computing system 905 may include one or more communication interfaces 940. The communication interfaces 940 may be used to communicate with one or more other systems. The communication interfaces 940 may include any circuits, components, software, etc. for communicating via one or more networks (e.g., networks 955). In some implementations, the communication interfaces 940 may include for example, one or more of a communications controller, receiver, transceiver, transmitter, port, conductors, software and/or hardware for communicating data/information.

The computing system 905 may also include one or more user input components 945 that receives user input. For example, the user input component 945 may be a touch-sensitive component (e.g., a touch-sensitive user interface of a mobile device) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 905 may include one or more output components 950. The output components 950 may include hardware and/or software for audibly or visually producing content. For instance, the output components 950 may include one or more speakers, earpieces, headsets, handsets, etc. The output components 950 may include a display device, which may include hardware for displaying a user interface and/or messages for a user. By way of example, the output component 950 may include a display screen, CRT, LCD, plasma screen, touch screen, TV, projector, tablet, and/or other suitable display components.

The computing system 905 may train the models 935 via interaction with the training computing system 902 that is communicatively coupled over the networks 955. The training computing system 902 may be separate from the server computing system 901 or may be a portion of the server computing system 901.

The training computing system 902 may include one or more computing devices 904. In an embodiment, the training computing system 902 may include or is otherwise implemented by one or more server computing devices. In instances in which the training computing system 902 includes plural server computing devices, such server computing devices may operate according to sequential computing architectures, parallel computing architectures, or some combination thereof.

The training computing system 902 may include a control circuit 908 and a non-transitory computer-readable medium 914, also referred to herein as memory 914. In an embodiment, the control circuit 908 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 908 may be programmed by one or more computer-readable or computer-executable instructions stored on the non-transitory computer-readable medium 914.

In an embodiment, the non-transitory computer-readable medium 914 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 914 may store information that may be accessed by the control circuit 915. For instance, the non-transitory computer-readable medium 914 (e.g., memory devices) may store data 916 that may be obtained, received, accessed, written, manipulated, created, and/or stored. The data 916 may include, for instance, any of the data (e.g., data logs) or information described herein. In some implementations, the training computing system 902 may obtain data from one or more memories that are remote from the training computing system 902.

The non-transitory computer-readable medium 914 may also store computer-readable instructions 922 that may be executed by the control circuit 908. The instructions 922 may be software written in any suitable programming language or may be implemented in hardware. The instructions may include computer-readable instructions, computer-executable instructions, etc.

The instructions 922 may be executed in logically or virtually separate threads on the control circuit 908. For example, the non-transitory computer-readable medium 914 may store instructions 922 that when executed by the control circuit 908 cause the control circuit 908 to perform any of the operations, methods and/or processes described herein. In some cases, the non-transitory computer-readable medium 914 may store computer-executable instructions or computer-readable instructions, such as instructions to perform at least a portion of the methods of FIGS. 7 and 8.

The training computing system 902 may include a model trainer 926 that trains the machine-learned models 935 stored at the computing system 905 using various training or learning techniques. For example, the models 935 may be trained using a loss function. By way of example, for training a machine-learned columnar data compression model, general data compression model, or search model, the model trainer 926 may use a loss function. For example, a loss function can be backpropagated through the model(s) 935 to update one or more parameters of the model(s) 935 (e.g., based on a compression ratio of the loss function). Various loss functions can be used such as mean squared error, likelihood loss, cross entropy loss, hinge loss, and/or various other loss functions. Compression ratio descent techniques can be used to iteratively update the parameters over a number of training iterations.

The model trainer 926 may train the models 935 in an unsupervised fashion. As such, the models 935 may be effectively trained using computer generated data for particular applications or problem domains, which improves performance and adaptability of the models 935.

The training computing system 902 may modify parameters of the models 935 (e.g., the machine-learned models 203, 205, 408) based on the loss function such that the models 935 may be effectively trained for specific applications in an unsupervised manner without pre-determined bit sequence data.

The model trainer 926 may utilize training techniques, such as backwards propagation of errors. For example, a loss function may be backpropagated through a model to update one or more parameters of the models (e.g., based on a compression ratio of the loss function). Various loss functions may be used such as mean squared error, likelihood loss, cross entropy loss, hinge loss, and/or various other loss functions. Compression ratio descent techniques may be used to iteratively update the parameters over a number of training iterations.

In an embodiment, performing backwards propagation of errors may include performing truncated backpropagation. The model trainer 926 may perform a number of generalization techniques (e.g., weight decays, dropouts, etc.) to improve the generalization capability of a model being trained. In particular, the model trainer 926 may train the machine-learned models 935 based on a set of training data 928.

The training data 928 may include computer generated training data for training in an unsupervised fashion. In an example, the training data 928 may include computer generated sets of data indicative of bit sequences generated by the models 935. The training data 928 may be specific to a data set to help focus the models 935 on the particular encoding scheme.

The model trainer 926 may include computer logic utilized to provide desired functionality. The model trainer 926 may be implemented in hardware, firmware, and/or software controlling a general-purpose processor. For example, in an embodiment, the model trainer 926 may include program files stored on a storage device, loaded into a memory and executed by one or more processors. In other implementations, the model trainer 926 may include one or more sets of computer-executable instructions that are stored in a tangible computer-readable storage medium such as RAM, hard disk, or optical or magnetic media.

The training computing system 902 may include one or more communication interfaces 932. The communication interfaces 932 may be used to communicate with one or more other systems. The communication interfaces 932 may include any circuits, components, software, etc. for communicating via one or more networks (e.g., networks 955). In some implementations, the communication interfaces 932 may include for example, one or more of a communications controller, receiver, transceiver, transmitter, port, conductors, software and/or hardware for communicating data/information.

The one or more networks 955 may be any type of communications network, such as a local area network (e.g., intranet), wide area network (e.g., Internet), or some combination thereof and may include any number of wired or wireless links. In general, communication over a network 955 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 9 illustrates one example computing system that may be used to implement the present disclosure. Other computing systems may be used as well. For example, in an embodiment, the computing system 905 may include the model trainer 926 and the training data 928. In such implementations, the models 935 may be both trained and used locally at the computing system 905. In some of such implementations, the computing system 905 may implement the model trainer 926 to personalize the models 935.

Computing tasks discussed herein as being performed at certain computing device(s)/systems may instead be performed at another computing device/system, or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein may be adapted, rearranged, expanded, omitted, combined, or modified in various ways without deviating from the scope of the present disclosure. Some implementations are described with a reference numeral for example illustrated purposes and are not meant to be limiting.

What is claimed is:

1. A computing system comprising:
one or more processors; and
one or more memory resources storing instructions executable by the one or more processors to cause the one or more processors to perform operations, the operations comprising:
receiving, from a user computing device, a search query, wherein the search query is indicative of at least one log statement of a plurality of compressed log statements stored in an online analytical processing (OLAP) database;
analyzing, using a search algorithm, the search query to identify a user defined function, wherein the user defined function is indicative of one or more columns within the OLAP database;
parsing, using the search algorithm, the search query to convert the search query into one or more predicates, wherein;
the one or more predicates are indicative of an expression that evaluates to a true, a false, or an unknown statement, and
the one or more predicates indicate a condition to satisfy the search query based on the expression,
filtering, by the computing system, the plurality of compressed log statements based on the one or more predicates, wherein the filtering the plurality of compressed log statements comprises:
forwarding the search query to one or more search nodes of the OLAP database, to determine filtered compressed log statements based on the expression, and
consolidating the filtered compressed log statements across the one or more search nodes to generate a query result; and
providing, to the user computing device for display on a user interface, the query result from the OLAP database, wherein the query result is indicative of the filtered compressed log statements comprising the at least one log statement.

2. The computing system of claim 1, wherein filtering the plurality of compressed log statements based on the one or more predicates comprises:
determining an index type, the index type indicative of a type of log statement of the plurality of compressed log statements; and
searching a dictionary for corresponding dictionary entries, wherein the corresponding dictionary entries are indicative of the filtered compressed log statements that match the index type.

3. The computing system of claim 2, wherein searching the dictionary for the corresponding dictionary entries comprises generating a text index over the dictionary.

4. The computing system of claim 2 wherein filtering the plurality of compressed log statements based on the one or more predicates comprise analyzing a forward index to determine the corresponding dictionary entries.

5. The computing system of claim 1, wherein the operations comprise:
analyzing, using the search algorithm, the search query to identify a log template and a variable, wherein the log template and the variable are parsed from the search query; and
filtering, by the computing system, the plurality of compressed log statements based on the log template and the variable.

6. The computing system of claim 1, wherein the search algorithm decodes the one or more log statements of the plurality of compressed log statements that satisfy the one or more predicates.

7. The computing system of claim 1, wherein the user defined function comprises a match function, the match function indicative of one or more boolean functions that match encoded log text of the plurality of compressed log statements with an expression in the search query.

8. The computing system of claim 1, wherein the user defined function comprises an extract function, the extract function indicative of one or more boolean functions that extracts encoded log text of the plurality of compressed log statements that match an expression in the search query.

9. The computing system of claim 1, wherein the user defined function comprises a reconstruction function, the reconstruction function indicative of reconstructing an original log message from the plurality of compressed log statements that match an expression in the search query.

10. A computer-implemented method comprising:
receiving, from a user computing device, a search query, wherein the search query is indicative of at least one log statement of a plurality of compressed log statements stored in an online analytical processing (OLAP) database;
analyzing, using a search algorithm, the search query to identify a user defined function, wherein the user defined function is indicative of one or more columns within the OLAP database;
parsing, using the search algorithm, the search query to convert the search query into one or more predicates, wherein;
the one or more predicates are indicative of an expression that evaluates to a true, a false, or an unknown statement, and
the one or more predicates indicate a condition to satisfy the search query based on the expression;
filtering the plurality of compressed log statements based on the one or more predicates, wherein the filtering the plurality of compressed log statements comprises:
forwarding the search query to one or more search nodes of the OLAP database to determine filtered compressed log statements based on the expression, and
consolidating the filtered compressed log statements across the one or more search nodes to generate a query result; and
providing, to the user computing device for display on a user interface, the query result from the OLAP database, wherein the query result is indicative of the filtered compressed log statements comprising the at least one log statement.

11. The computer-implemented method of claim 10, wherein filtering the plurality of compressed log statements based on the one or more predicates comprises:
determining an index type, the index type indicative of a type of log statement of the plurality of compressed log statements; and
searching a dictionary for corresponding dictionary entries, wherein the corresponding dictionary entries are indicative of the filtered compressed log statements that match the index type.

12. The computer-implemented method of claim 11, wherein searching the dictionary for the corresponding dictionary entries comprises generating a text index over the dictionary.

13. The computer-implemented method of claim 11, wherein filtering the plurality of compressed log statements based on the one or more predicates comprise analyzing a forward index to determine the corresponding dictionary entries.

14. The computer-implemented method of claim 10, further comprising:
analyzing, using the search algorithm, the search query to identify a log template and a variable, wherein the log template and the variable are parsed from the search query; and
filtering the plurality of compressed log statements based on the log template and the variable.

15. The computer-implemented method of claim 10, wherein the search algorithm decodes the one or more log statements of the plurality of compressed log statements that satisfy the one or more predicates.

16. The computer-implemented method of claim 10, wherein the user defined function comprises a match function, the match function indicative of one or more boolean functions that match encoded log text of the plurality of compressed log statements with an expression in the search query.

17. The computer-implemented method of claim 10, wherein the user defined function comprises an extract function, the extract function indicative of one or more boolean functions that extracts encoded log text of the plurality of compressed log statements that match an expression in the search query.

18. A non-transitory computer-readable media storing instructions that are executable by one or more processors to cause the one or more processors to perform operations, the operations comprising:
receiving, from a user computing device, a search query, wherein the search query is indicative of at least one log statement of a plurality of compressed log statements stored in online analytical processing (OLAP) database;
analyzing, using a search algorithm, the search query to identify a user defined function, wherein the user defined function is indicative of one or more columns within the OLAP database;
parsing, using the search algorithm, the search query to convert the search query into one or more predicates, wherein;
the one or more predicates are indicative of an expression that evaluates to a true, a false, or an unknown statement, and
the one or more predicates indicate a condition to satisfy the search query based on the expression;
filtering the plurality of compressed log statements based on the one or more predicates, wherein the filtering the plurality of compressed log statements comprises:
forwarding the search query to one or more search nodes of the OLAP database to determine filtered compressed log statements based on the expression, and
consolidating the filtered compressed log statements across the one or more search nodes to generate a query result; and
providing, to the user computing device for display on a user interface, the query result from the OLAP database, wherein the query result is indicative of the filtered compressed log statements comprising the at least one log statement.

* * * * *